United States Patent
Green et al.

(10) Patent No.: US 10,943,262 B2
(45) Date of Patent: Mar. 9, 2021

(54) TELECOMMUNICATIONS CALL AUGMENTATION SYSTEM

(71) Applicant: Incall Limited, London (GB)

(72) Inventors: Chaim Aaron James Green, London (GB); Joshua Nyman, London (GB)

(73) Assignee: Incall Limited, London (GB)

(*) Notice: Subject to any disclaimer, the term of this patent is extended or adjusted under 35 U.S.C. 154(b) by 829 days.

(21) Appl. No.: 15/158,974

(22) Filed: May 19, 2016

(65) Prior Publication Data

US 2016/0343034 A1 Nov. 24, 2016

Related U.S. Application Data

(63) Continuation of application No. PCT/GB2014/053455, filed on Nov. 21, 2014.

(30) Foreign Application Priority Data

Nov. 21, 2013 (GB) ..................................... 1320598

(51) Int. Cl.
*G06Q 30/02* (2012.01)
*H04M 3/42* (2006.01)
(Continued)

(52) U.S. Cl.
CPC ..... *G06Q 30/0267* (2013.01); *G06Q 30/0255* (2013.01); *G06Q 30/0277* (2013.01);
(Continued)

(58) Field of Classification Search
CPC combination set(s) only.
See application file for complete search history.

(56) References Cited

U.S. PATENT DOCUMENTS

2008/0160956 A1 7/2008 Jackson et al.
2009/0043657 A1* 2/2009 Swift ................ G06Q 30/0212
705/14.14
(Continued)

FOREIGN PATENT DOCUMENTS

WO WO 2009/020973 2/2009
WO WO 2013/042890 3/2013
WO WO 2015/075472 5/2015

OTHER PUBLICATIONS

Guy Yaniv. "Sold on mobile marketing: effective wireless carrier mobile advertising and how to make it even more so." Dec. 2008, International Journal of Mobile Marketing, vol. 3 No. 2, pp. 86-91. (Year: 2008).*

(Continued)

*Primary Examiner* — William A Brandenburg
*Assistant Examiner* — Christopher C Busch

(57) ABSTRACT

The present invention relates to a method of augmenting a telecommunications call, the method comprising detecting a telecommunications call event at a user telecommunications device 10; selecting an item of media content 101, the item of media content 101 being associated with a uniform resource identifier or URI; augmenting the call with the item of media content 101; detecting a user interaction with the item of media content 101; and on termination of the call, performing an action in dependence on the resource identified by the URI. The invention extends to a corresponding system and apparatus.

19 Claims, 7 Drawing Sheets

(51) Int. Cl.
*H04M 3/487* (2006.01)
*H04M 7/00* (2006.01)
*H04L 29/08* (2006.01)

(52) U.S. Cl.
CPC ........ *H04L 67/22* (2013.01); *H04M 3/42042* (2013.01); *H04M 3/42059* (2013.01); *H04M 3/4878* (2013.01); *H04M 7/0036* (2013.01); *H04M 3/42102* (2013.01); *H04M 2203/2011* (2013.01); *H04M 2203/353* (2013.01)

(56) References Cited

U.S. PATENT DOCUMENTS

| | | |
|---|---|---|
| 2009/0203361 A1 | 8/2009 | Huang et al. |
| 2012/0278167 A1 | 11/2012 | Schwartz |
| 2013/0051542 A1 | 2/2013 | Yao et al. |
| 2014/0325025 A1* | 10/2014 | Yeleswarapu ........... H04L 63/10 709/219 |

OTHER PUBLICATIONS

International Search Report and the Written Opinion dated Mar. 20, 2015 From the International Searching Authority Re. Application No. PCT/GB2014/053455.

\* cited by examiner

Incoming call screen advert

Overlay Example 1: Movable banner ad

Overlay Example 2: Custom animation

Diagram of two-phase advertisement selection algorithm

TELECOMMUNICATIONS CALL AUGMENTATION SYSTEM

This invention relates to a telecommunications call augmentation system and in particular to a method of and apparatus for augmenting a call with media content. The invention has particular relevance to providing a user of a telephone, especially of a mobile telephone or cellphone, such as a smartphone, with targeted media content in a noticeable yet unobtrusive fashion. Various embodiments are described wherein an initial item of media content is used as a trigger or advertisement which when activated by the user presents further media content.

Modern telephones have become increasingly sophisticated and many are able to present or play a wide variety of forms of media content to their users. This is especially the case with those mobile telephones or cellphones known as 'smartphones', which are effectively portable computers with telephone functionality and often internet connectivity.

Various attempts have been made to make use of this media playing ability of smartphones in order to present the user with pertinent information—for example, service alerts and advertisements—at times other than those at which the user is specifically seeking them out. A particular challenge is to make such alerts noticeable to the user yet not overtly obtrusive. The present invention aims to address at least some of these problems.

Generally, there is provided a method of augmenting a telecommunications call with media content, preferably the media content being dependent on an attribute of the called or calling party, more preferably the media content enabling the called or calling party to access further related media content or services.

According to one aspect of the invention, there is provided a method of augmenting a telecommunications call, the method comprising: detecting a telecommunications call event at a user telecommunications device; selecting an item of media content, the item of media content being associated with a uniform resource identifier or URI; augmenting the call with the item of media content; detecting a user interaction with the item of media content; and on termination of the call, performing an action in dependence on the resource identified by the URI.

Augmenting the call in this way may allow for a selected media content item to be presented to a user of a telecommunications device in a noticeable yet unobtrusive fashion (and without distracting the user while the call is in progress). This may be particularly useful for presenting public notices and alerts, including advertising.

Preferably, the selection of the item of media content is in dependence on an attribute of the call. The selection of the item of media content may be in dependence on an attribute of the user device and/or an attribute of the user, such as the user's browsing history, call history, and text message data, an associated identity, an associated location and/or an associated date and/or time.

Preferably, the selection of the item of media content is in dependence on an attribute of a party placing the call.

Preferably, the selection of the item of media content is in dependence on an attribute of a party receiving the call.

Preferably, the item of media content comprises an image or video, and augmenting the call comprises displaying the media content to the user, preferably overlaid on a call screen of the device.

Preferably, wherein the item of media content comprises audio, and augmenting the call comprises playing the media content to the user.

Preferably, the method further comprises receiving the item of media content from a remote server. Receiving the item of media content may occur before an incoming call is received or an outgoing call is made; presentation of the media content to the user may occur before, during or after the incoming call is received or the outgoing call is made.

Thus, in one example, the media content is presented to the user during call initiation or set up, that is, at the time of an incoming call alert, or while the user is waiting for a placed outgoing call to be picked up. In a further example, the media content is presented to the user after termination of a call (incoming or outgoing). Furthermore, the media content might be presented to the user multiple times during the placement or reception of a call and/or the media content might be split up so that, for example, part of the media content is presented while a call is being initiated, and a further portion of the media content is presented after termination of the call.

Preferably, the selection of the item of media content is performed at a remote server.

Preferably, the method further comprises storing the item of media content in a local cache on the user device. This may reduce the time required for the media content to be first displayed by the device.

The call (event) may be an incoming or an outgoing call.

Preferably, the user interaction with the item of media content is reported to a remote server.

Preferably, items of media content are provided to the remote server by a media content provider.

Preferably, a selection of the item of media content is performed at the user device.

Preferably, the action performed in dependence on the resource identified by the URI comprises accessing a network location, optionally accessing a web page.

Preferably, the action performed in dependence on the resource identified by the URI comprises initiating a further telecommunications call.

According to another aspect of the invention, there is provided a computer program product comprising software code adapted when executed to perform the methods as herein described.

According to another aspect of the invention, there is provided a software development kit, comprising software code for performing any of the methods as herein described, and adapted to be bundled together with a further software application, preferably a "third-party" software application.

According to another aspect of the invention, there is provided apparatus for performing any of the methods as herein described.

According to a further aspect of the invention, there is provided an apparatus for augmenting a telecommunications call, the apparatus comprising: means for detecting a telecommunications call event at a user telecommunications device; means for selecting an item of media content, the item of media content being associated with a uniform resource identifier or URI; means for augmenting the call with the item of media content; means for detecting a user interaction with the item of media content; and means for, on termination of the call, performing an action in dependence on the resource identified by the URI.

According to a further aspect of the invention, there is provided a method of co-ordinating multiple instances of call augmentation applications, apportioning advertising income appropriately, preferably according to user interactions with particular application instances.

Preferably, the or each call augmentation application is bundled to, or forms part of, a further application.

Preferably, the call augmentation application is in the form of a computer program product as herein described.

According to a further aspect of the invention, there is provided a system for augmenting telecommunications calls, the system comprising: apparatus as herein described at least in part implemented in software code executable on a client device, the client device preferably being in the form of a mobile communications device, more preferably a smart phone; and a remote server having stored thereon media content for augmenting communications between the apparatus and at least one further similar apparatus.

According to another aspect of the invention, there is provided apparatus for augmenting a telecommunications call, the apparatus comprising: a detecting module for detecting a telecommunications call event at a user telecommunications device; a selecting module for selecting an item of media content, the item of media content being associated with a uniform resource identifier or URI; an augmenting module for augmenting the call with the item of media content; a module for detecting a user interaction with the item of media content; and a module for performing an action in dependence on the resource identified by the URI.

Preferably, the apparatus is adapted to be implemented at least in part in software code executable on a client device, the client device preferably being in the form of a mobile communications device, more preferably a smart phone.

The invention extends to methods, system and apparatus substantially as herein described and/or as illustrated with reference to the accompanying figures.

According to another aspect of the invention there is provided a software development kit, comprising software code for performing any of the methods described.

According to another aspect of the invention there is provided apparatus for performing any of the methods described.

The present invention relates to providing advertising space on the incoming call screen of a mobile phone.

Generally, there is provided a method of augmenting a telecommunications call with media content on an incoming or outgoing call screen of a mobile phone.

Embodiments of the present invention may comprise one or more of the following features:

1. a method of persuading mobile phone users to accept call screen advertising, in particular in the form of a hyperlinked incoming call screen advertisement
2. a method of displaying a media content item associated with a telephone call in a way that does not interrupt the call, preferably making use of screen "real-estate" which is otherwise underused
3. a method for accessing a user's incoming call screen for displaying media content, for example advertisements
4. a method of providing user-friendly call screen advertisements which can be linked to relevant information
5. a method of co-ordinating multiple instances of call augmentation applications, preferably apportioning advertising income appropriately (for example according to user interactions with particular application instances)
6. enabling software developers to bundle software for providing such call screen advertising together with their ("free") software applications in addition to—or instead of—facilitating advertising within their software applications, and preferably enabling users to select which form of advertising they would prefer.

The item of media content may be an advertisement selling at least one product, promoting or providing information, or displaying any other type of information for informing the user.

Generally, in accordance with one broad aspect of the invention there is provided a method of providing a media content item such as an advertisement to a user of a mobile device, the mobile device comprising at least a phone function and a screen, the method comprising: providing a call screen display software application to the phone of a user, wherein said application comprises means for displaying media content on at least the incoming call screen of said mobile device; selecting at least one media content item such as an advertisement to be displayed on said call screen; providing said media content item such as an advertisement to said phone; and displaying said media content item such as an advertisement on said call screen, preferably when a call occurs between said user and a second party.

A potential advantage of the present invention is that it may provide a further opportunity for third parties such as advertisers; that of the incoming call screen. A further potential advantage is that it may provide a means of gaining access to the user's call screen via a second software application. A still further potential advantage is afforded by a delay feature which enables hyperlinks within the media content items or advertisements to be clicked without interrupting a call.

In this document, the user—or first party—refers to the user of the smartphone or other communications device.

The second party is the party involved in the conversation with the user. This may be a person such as an acquaintance, who may be the caller or callee, or may be an automated call handling system, answerphone, or any other party partaking in a call.

Preferably, the media content item provides information from a third party other than the second party, that is, the third party is neither the user nor the second party involved in the call. The third party may, for example, be a vendor advertising their products, or an authority providing public information such as news or weather. The third party may alternatively be the provider of the communications network used by the smartphone or other communications device.

In some embodiments, the media content item provides information from the second party in the call. This may allow a second party to identify themselves or provide other relevant information to the user when the second party calls the user, or when the user calls the second party. The second party in this case may, for example, be a bank providing information about customer support services or advising how to contact such services. Alternatively, the second party may be a vendor providing information about their products. Embodiments may be used in conjunction with a telephone conversation about products, providing a way for vendors to "warm call" potential customers, as opposed to traditional cold calling. Optionally, this example may be provided in the case where a user has previously installed an app associated with the vendor on their handset. In this case, the vendor's app may serve as the "host" app for the call augmentation system/software.

The media content item may be an entire page, a banner, and may cover all or any part of the mobile device screen. Preferably the media content item covers most of the screen, but leaves uncovered the area of the screen in which the operating system of the mobile device displays the caller ID.

The media content item may comprise at least one hyperlink which links to a phone number of the third party. This hyperlink may delay calling the phone number of the advertiser until the end of the current phone call, and automatically call the phone number at the end of the current call, or may display the number to be dialled along with an option to dial it, when clicked and for the duration of the original call, or only at the end of the original call. Alternatively, the hyperlink may connect to a web site or page.

References to media content item, image and coding are used interchangeably.

The call-screen display software application may be a software component installed on the mobile device, wherein said application comprises means for displaying media content on at least the incoming call screen of said mobile device.

The media content able to be displayed may be a wide variety of media content such as pictures, videos, internet data and the like.

Generally, the term uniform resource identifier or URI refers to any means, such as a network or web address (eg. a URL) or number (eg. an IP address), by which a resource, such as an item of media content, may be located and/or identified. With reference to a client device, a URI may direct to a location internal to the client device (eg. to a local cache) or to an external location, such as a server accessible over a network.

Software applications, especially in the context of mobile phones or smartphones, may also be referred to herein as "apps".

Preferably, the method when implemented as a mobile phone application or 'app' conforms to the guidelines or policies of the network/operating system provider or app distributer, for example, by conforming to requirements such as:
 making clear to the user the association of the app with the media content
 not impermissibly changing device function without user consent
 if changes are made, making clear to the user which changes are due to the app
 allowing the user to easily reverse any changes via device and/or app preferences—or by uninstalling the app
 not simulating system notifications or warnings
 allowing the user to dismiss media content presented by the app
 not interfering with third party media content The software application may be used to display an item of media content on the call screen of a mobile device when a call occurs between the mobile device user and a second party. The call screen is defined as the image or content displayed on the screen when a call occurs. This may be for the duration of the call, part of the call, or only until the call is answered. The call screen usually displays information about the second party in the call, such as a phone number or name, along with means for interacting with the call by answering, rejecting, putting on hold, and the like. The call is preferably an incoming call although it may additionally or alternatively be an outgoing call.

The system also provides for various ways of charging for the media content, for example on a CPM (cost per mille or thousand) impressions basis, or CPC (cost per click), or a combination of both.

Further features of the invention are characterised by the appended claims.

The invention also provides a computer program and a computer program product for carrying out any of the methods described herein, and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein, and/or for embodying any of the apparatus features described herein, a method of transmitting such a signal, and a computer product having an operating system which supports a computer program for carrying out the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied apparatus aspects, and vice versa. As used herein, means plus function features may be expressed alternatively in terms of their corresponding structure, such as a suitably programmed processor and associated memory.

Furthermore, features implemented in hardware may generally be implemented in software, and vice versa. Any reference to software and hardware features herein should be construed accordingly.

Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention will now be described, purely by way of example, with reference to the accompanying drawings, in which.

GENERAL OVERVIEW

Figure 1:
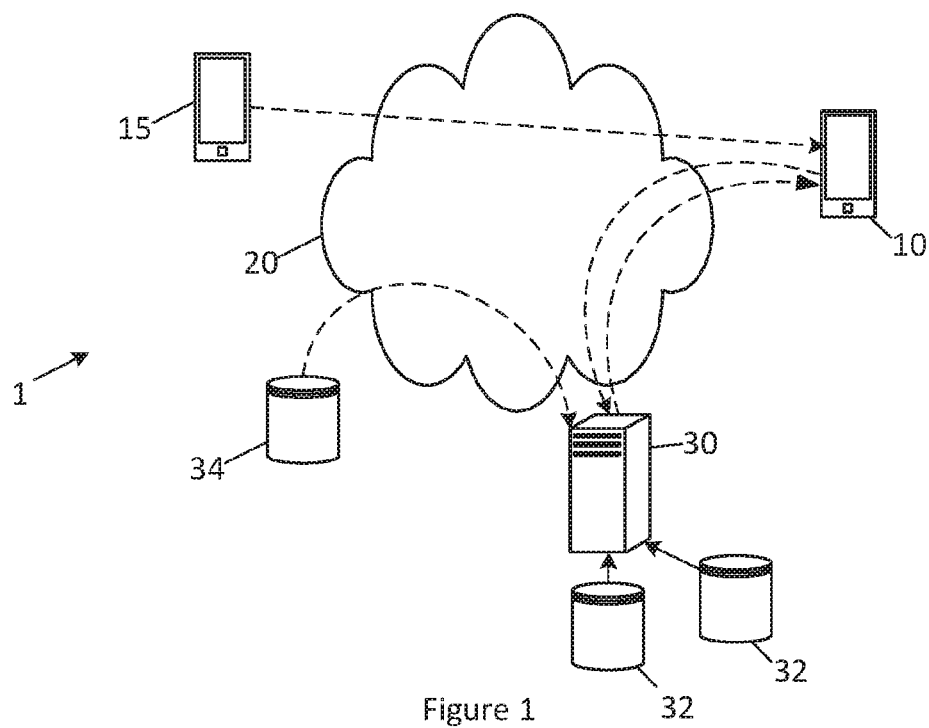
FIGS. 1 and 2 show an overview of a telephone call augmentation system.
Figure 2:
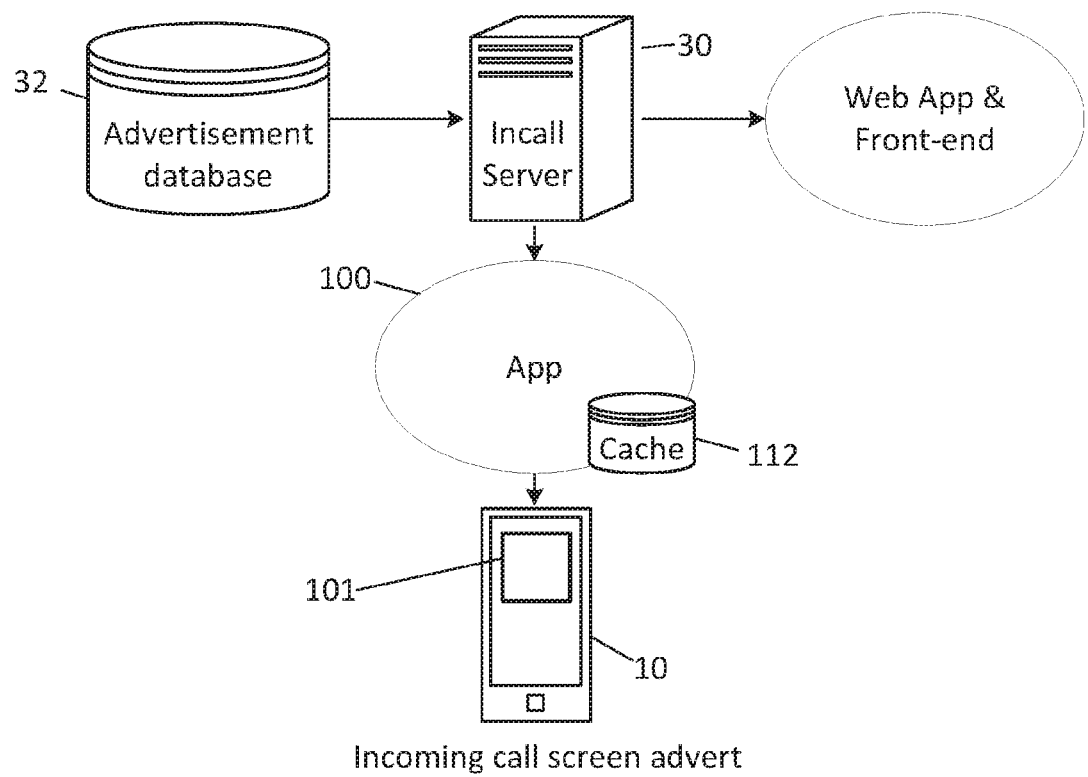

FIGS. 1 and 2 show an overview of a telephone call augmentation system 1. A client device 10, comprising for example a telephone handset—such as a smartphone—is adapted to receive telephone calls from a second client device, telephone 15, over a communications network 20.

Network 20 may be an IP-based network, a 3G (or higher) telecommunications network or represent a combination of different types of communications networks.

Telephone 10 is also in communication via network 20 with a media server 30, which stores (for example in a database) and serves media content from local storage 32 and/or remote storage 34 to telephone 10, which may optionally store the received media content locally at store or cache 112 (which may be internal to telephone 10) for later display.

Figure 3:
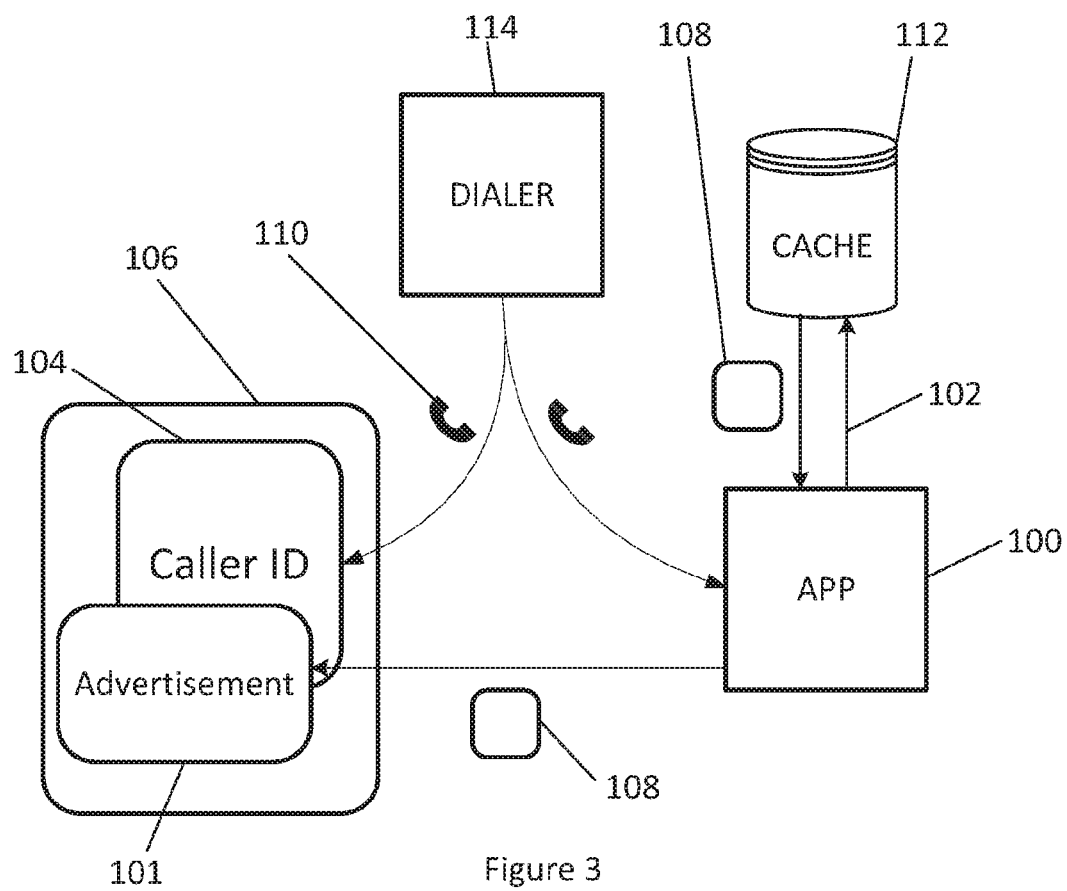
FIGS. 3 and 4 show schematic diagrams of a telephone handset upon which a call augmentation system/method is implemented.
Figure 4:
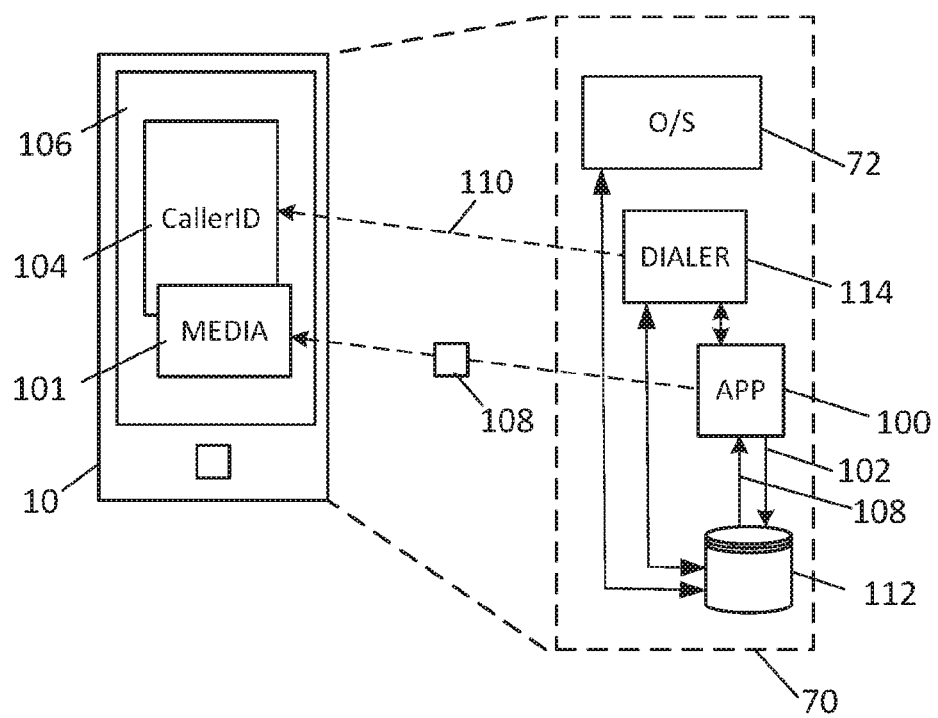

FIGS. 3 and 4 show the telephone handset 10 in more detail, including the display screen 106 on which callerID information 104 identifying the caller is usually displayed when the telephone 10 receives an incoming call. Also shown are example contents of the system memory or software architecture 70 of the telephone 10 when in operation, showing the operating system (OS) 72, the "dialler" application 114 which handles the making and receiving of telephone calls, and telephone call augmentation application (commonly referred to as an "app") 100. Local storage 112 may be shared by the operating system 72 and software applications installed on the telephone 10.

In brief, when the app 100 is active and telephone 10 receives an incoming call, a media content image 101 is shown on the screen 106 overlaid on top of the default incoming call screen 104 (or, in the case of audio media content, played from the loudspeaker in place of the ringtone).

The user can then optionally select the media content image 101 (which will cause it to be shown after the current call has ended) and can also elect whether to accept or decline the call as normal.

The media content is displayed on the incoming call screen rather than within the app itself, i.e. the display of media content image 101 is integrated with the usual display of information on screen 104.

A software development kit may also be provided to allow third parties to develop variants of the telephone call augmentation application "app" 100, which is then optionally bundled with their own "host" apps.

In some embodiments, the software system—also referred to here as "Incall"—in its full form comprises three components:

- A mobile SDK which displays advertisements on the incoming call screen of mobile devices
- An automated brokerage system which connects developers with advertisers, provides advertising analytics and handles payment flows and business logic
- A series of algorithms that determine which advertisement(s) should be displayed on the device.

A basic commercial embodiment may comprise the following:

- A mobile SDK which bundles the code to display the advertisements so that it can be bundled into third-party apps
- A web interface front-end which facilitates the manual administration of the advertising system, and which provides a basic set of metrics from which financial data can be calculated
- A web back-end and protocol which handles the storage of adverts, the transmission of adverts to the clients

DETAILED OVERVIEW

Generally, the system 1 comprises the following components:

A client or user device, typically a smartphone 10
A server 30 which manages and tracks the media content 108, determines which items of media content are to be sent to the user device 10, and delivers the media content 108 to the application 100.
Media content
A client software application 100 to serve media content to a smartphone
A background service
An algorithm (optionally, two algorithms, one on the server 30 and/or one as part of the client app 100) to select the appropriate media content 108 with which to augment the call Optionally, a SDK (software development kit) for the development of third-party variants of app 100, particularly for mobile devices The software application may be pre-installed on the mobile device, or may be available to download for free or for a price from the internet and/or from a software application platform such as iTunes™ or Android Market/Google Play and/or bundled with or otherwise coupled with other (potentially free) apps.

—Client Device

The mobile or client device comprises at least a screen 106 and a phone function in the form of a dialler circuit or application 114, which handles incoming and outgoing calls and displays an incoming call screen image including a caller ID on the screen of the device, among other functions.

The screen may be an LCD screen, touch screen, or the like. Preferably the mobile device further comprises internet connection capability and an internet browser. Such devices are commonly referred to as 'smart phones'.

—Server

The server may send items of media content to local caches upon receipt of media content requests, or may push them to the caches periodically, or when new media content becomes available.

The items of media content may alternatively be sent from the server(s) directly to the application directly using, for example, a cloud-based service such as Google Cloud Messaging (for Android) or Push Notifications (for iOS).

The server 30 applies a proprietary algorithm to determine the media content 108 to be displayed. The server 30 also establishes an audit trail and maintains accounts for each app 100 and media content 108 selections in order to distribute revenues to developers.

The server may perform any or all of the following back-end activities:

maintaining a global database of all the items of media content;
applying an algorithm to determine which items of media content should be delivered to the client-side app and/or to the cache on the mobile device of the user;
maintaining an audit trail comprising records of which items of media content have been displayed (served) and which hyperlinks have been selected (clicked);
receiving payments from media content providers, calculating revenue share, and making payments to developers, such as second software application developers.

The server may also perform any or all of the following front-end services:

secure area for media content providers to manage their items of media content and make payments;
secure area for software developers to register their software application (for example, by means of identifiers) and receive payment;
secure area for system administrators to monitor the overall system status and retrieve media content provider/developer records.

The server may be implemented for example on the LAMP (Linux, Apache, MySQL, PHP) stack as a PHP application with a MySQL database for storing the items of media content. The server may comprise a REST-based interface (API) for communication with the software application. SSL may be used for additional security. Further security measures to counter 'click fraud' may also be implemented, as discussed below.

The server front-end is the part of the server-based system that the administrators see, from where the system is administered (adding apps and advertisements) and advertising metrics viewed. It may have one or more of the following features:
- accessible through the web browser as HTML pages, which are generated with PHP
- provides a secure, password-protected area for administrators to administrate the system
- secured via HTTP basic authentication
- allows app_ids to be generated (in more advanced implementations, there is also provided means for revoking app_ids/instance_ids)
- allows advertisements to be created and for the corresponding images to be uploaded in PNG image format and stored on the server. In more advanced implementation, multiple images may be supplied for different aspect ratios/pixel densities
- allows a target URL to be specified for each advertisement
- allows existing advertisements to be deleted from the server.
- provides metrics on which advertisements have been clicked and which host app(s) have been the source of the clicks (potentially adapted to show impressions if the system tracks impressions). For example:

|  | Virgin Atlantic | Coca Cola | Nike | 1-Mobile |
| --- | --- | --- | --- | --- |
| Angry Goats | 819 | 219 | 38 | 432 |
| Pinstagram | 1024 | 381 | 564 | 1003 |
| Temple Dash | 7 | 5 | 13 | 8 |
| Cut the String | 200 | 281 | 543 | 391 |

The server back-end of the server-side system typically comprises:
- A series of PHP scripts which provide the REST-based API that the client app uses to communicate with the server
- A MySQL database which contains a listing of all the advertisements in the system, as well as an audit trail of all the click data An example database schema is as follows:

| | Data |
| --- | --- |
| hosts table | App ID |
| | App name |
| | Developer name |
| | Developer email address |
| | Timestamp of creation |
| instances table | App ID |
| | Instance ID |
| | Timestamp of creation |
| advertisements table | Advert ID |
| | Client ID |
| | Advert target URL-where the advert takes the user when it's clicked |
| | Date uploaded |
| reports table | Report ID |
| | Instance ID |
| | Report start date |
| | Report end date |
| clicks table | Report ID |
| | Advert ID |
| | Clicks |
| | Impressions (if impressions are being tracked) |

—Media Content

The item of media content may comprise one or more of the following:
- a video clip, animation, image, slideshow, text, hyperlink, web page, URL, audio clip, ringtone, or any combination of the above.
- a combination of the above such as to produce a display comprising text, at least one image and at least one hyperlink, similar to a banner advertisement provided on internet websites.
- an animated and hyperlinked image moving across the screen, such as a hyperlinked image of an aeroplane say moving from right to left, or a hyperlinked box of cereal pouring flakes into a bowl.
- Speech, music or other audio may be a part of the media content and may be played while the image or animation is displayed.

The item of media content may use .jpg, .gif, or any other suitable file formats, and may be written in html, php, javascript or any other suitable programming language.

The item of media content is stored (for example, in a database) on a remote server which provides the media content as required by the mobile device. Alternatively, the item (or items) of media content may be stored on multiple servers, locally or remotely, and periodically accessed by mobile devices.

In order to provide delivery of the media content from the server to the phone, each item of media content is encoded into a specific format to be transmitted and stored on the phone.

In the simplest implementation of a basic banner display format, each media content "payload" comprises an image, preferably provided in different sizes and at different DPI for different screen resolutions and aspect ratios (so that the server can select the most appropriate format of media content to send for a specific device to reduce cache/bandwidth wastage).

The media content item is "clickable" or otherwise is capable of triggering a further action (most commonly, opening a webpage).

Associated metadata is supplied in XML/JSON format which provides a URL that is launched if the media content is selected/clicked, along with some other data to by the app in order to select which item of media content to display.

In a more complex implementation, each "payload" includes multiple media types (e.g. image and audio file), or animation behaviour, along with more comprehensive metadata.

The more metadata is supplied with the media content, the more information is available to the server/app to select the most appropriate app to serve.

Generally, the media content is presented as an overlay with one or more of the following properties:
- triggered when an incoming or outgoing phone call event is triggered
- is overlaid onto the incoming call screen
- takes up the entire screen width and the height is set to a fixed height in display pixels (determined during build)
- displays a single PNG image advertisement (potentially selected at random from the local advert cache), appropriately sized for the overlay
- records an impression for the advert (if impressions are being tracked)
- the image advertisement is clickable
- is hidden once the call is accepted or rejected
- is movable (this may not be possible in all versions of operating systems and on all handsets) by pressing and dragging it upwards/downwards, in order to support different types of diallers on different handsets and operating systems/versions, and so as not to obscure any caller ID information from the native dialler if the advertisement on the overlay is clicked, then after the call has been accepted, rejected or completed the corresponding website is launched in the default browser, and the click data is recorded locally, ready to be sent to the server indicating that the advert was clicked in order to comply with guidelines or policies of the network/operating system provider or app distributer, the overlay contains information about the source of the advert and any other details that may be required for compliance. This information could be displayed in a pop-up dialog window where necessary has a button which can be selected in order to close it.

has buttons showing ticks and crosses, or other positive and negative symbols, which can be selected in order to accept or reject a presented offer.

—Client Application

The call augmentation client application or app 100 is typically a stand-alone application which is pre-installed on the client device as part of the device configuration by a network provider. Alternatively, the app may be downloaded from an app distribution platform, library or store such as Apple iTunes or Google Play.

The app 100 registers itself to receive updates from the phone 10 operating system 72 any time when an incoming call event is triggered.

Alternatively, the call augmentation client application 100 may be embedded in or form part of a second software application which has a different primary function. The second application may be also be preinstalled on the client device or available to download and install subsequently.

In this case the call augmentation application 100 may be a compulsory or optional component of the second application, and if optional, may be provided as an opt-in or opt-out option during installation of the second application or at any time during use thereof.

Since users do not usually readily volunteer to accept advertising, an advantage of providing the application as part of a second application is that users will be persuaded to accept the advertisement application because of a desire for the features of the second application.

In some embodiments, the option is provided to have media content provided either via the call augmentation client application 100 or via regular in-app methods, with the further option provided to switch between the two. This may be an option which can be activated by the user and/or a configuration option which can be set in the app. Thus, a user may select whether media content, such as advertising, is displayed within a "free" app, or having media content, such as advertising, displayed on an incoming or outgoing call screen display.

—Background Service

The background service is initialised by the third-party app, and is configured to run automatically in the background continually, and to restart itself automatically if the device is restarted.

In order to ensure that the media content can be displayed on-screen immediately without delay, items of media content may be cached locally on the device.

There are a number of different ways to implement the caching system, preferably with a background service to maintain it so way that it does not grow uncontrollably, but at the same time ensuring that there is an appropriate amount of media content available locally on the device.

The device might not have 3G/WiFi connectivity, or might not be able to use a data connection simultaneously to the incoming call, and either way mobile data connections are slow. Therefore, the background service periodically communicates with the server to download media content which is then stored locally on the device in a cache.

The cache is restricted to a particular maximum size and must be pruned periodically. In one example this is done is by checking to see if the cache reaches a particular size (e.g. 20 MB) and simply deleting older content to make way for the new (i.e. operating as FIFO queue).

A more complex version has the server flag each item of media content with an "expiry date" after which the item of media content will no longer be displayed and instead will be removed from the cache.

—Algorithms

A set of algorithms are used to determine which items of media content are to be displayed on the phone for a particular call. In order to provide targeted media content the app selects a media content item based on a wide range of criteria, optionally including ones based on real-time information (e.g. current location, caller information, etc.)

In cases where the client app can only select media content from its local cache (not the server), which is a subset of the total media content library which sits on the server, a two-phase media content selection algorithm is used, part of which runs on the server and part on the client, which aims to fulfil the following two conflicting goals:—

1. Minimise cache usage and data transfer overheads.
2. Ensure that the best possible media content item is selected on the device, without communicating with the server in real-time.

In order for the media content to be displayed effectively, the server decides which media content items are sent to the handset in advance of the call to be cached (this could be several hours in advance, or even days). The server makes certain assumptions or predictions about which items of media content are best-suited to the user. This is based on information which is periodically sent from the app back to the server, or alternatively on static information. The server has a wide range of media content from which to choose, but makes a selection of which items to send to the client based on fairly limited information.

Alternatively, the subset of the media content library sent to the client app is selected randomly.

The client-side algorithm, on the other hand, has a much larger set of data upon which to make a decision of which item of media content to show as it has access to real-time data (e.g. caller info, date/time/location, etc.) but has a smaller subset of media content to choose from (i.e. it can only select an item of media content that already exists in the cache).

Figure 10:
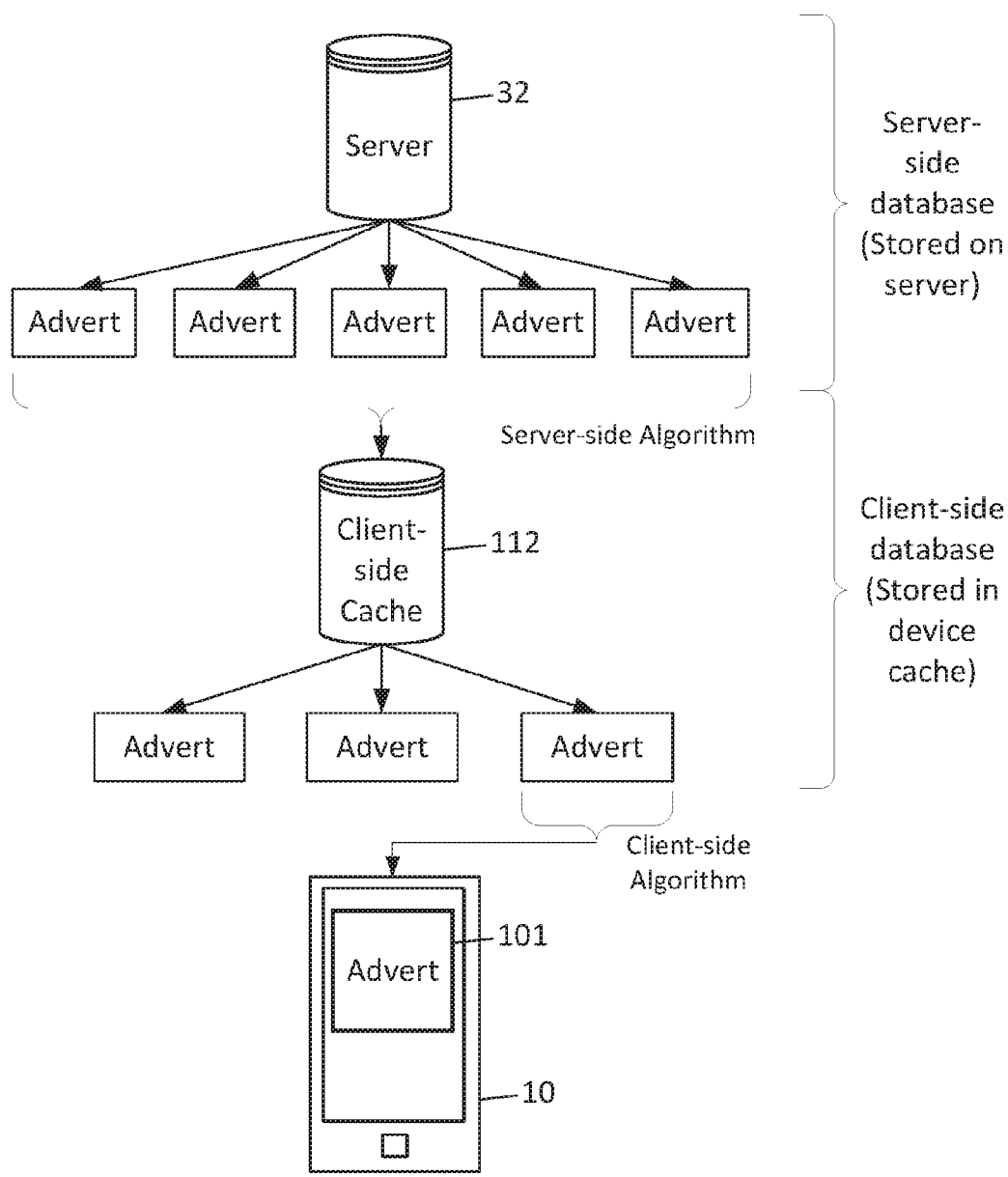
FIG. 10 shows an example of a media content item selection algorithm.

FIG. 10 shows an example of a media content item selection algorithm.

The two algorithms complement each other in order to achieve a balance between the two goals.

In the first phase, the server chooses which media content items (of those stored in server database 32) to send to the client. Then, in the second phase, the client selects the most appropriate media content item (from those stored in the cache 112) at the point of the incoming call.

Generally, the algorithms optimise the media item selection to maximise rates of user interactions or clicks. This may be based on prior market research or according to weightings determined from user interactions.

In some embodiments, up to four algorithms are used:
i) Server-side selection algorithm—Used to determine which adverts should be sent from the server to the client's device to be cached.
ii) Merge algorithm—Used to merge the new adverts received from the server with the old adverts stored in the cache.
iii) Client-side selection algorithm—Used to determine which advertisement should be selected from the cache and displayed on the incoming call screen.
iv) Combination algorithm—Used by both the server-side and client-side selection algorithms in order to combine multiple sorted lists into a single list. This allows the adverts to be effectively sorted by multiple factors.

Figure 11:
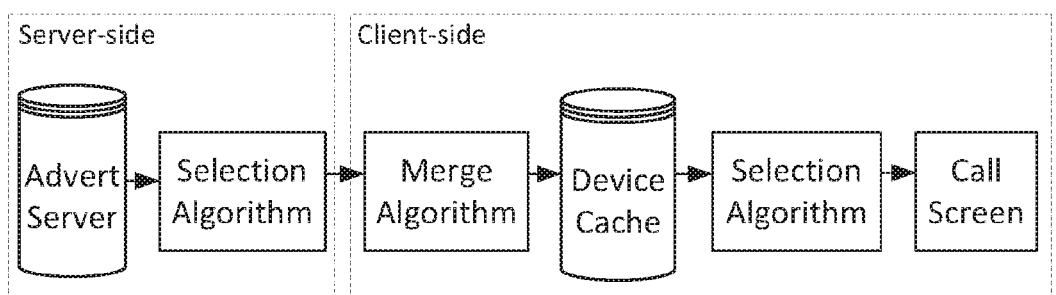
FIG. 11 shows a further example of media content item selection algorithms.

FIG. 11 shows a further example of media content item selection algorithms.

Generally, both the client- and server-side selection algorithms apply a similar 3-step process whereby the adverts from the cache are sequentially filtered and/or sorted and then combined, so with the result that a series of adverts are selected (on the server) or a single advert is selected (on the client).

Filter—select those adverts from the cache matching certain criteria.
Sort—sort them based on how closely they match the criteria.
Combine—once filters and sorts have been combined on the data in a single operation, then a "combination" stage is needed to combine all of the sorted data into a single list.
Select—select a single advert to display on the screen.

i) Server-Side Algorithm

The server uses an algorithm to determine which media content items to send to the client for local caching, based on factors such as:
Handset make/model and version of Android (operating system)
Previous items of media content shown
User preferences
Nature of the app providing the media content In some embodiments, the media content item is selected at random.

Generally, the purpose of this algorithm is to choose those adverts from the extensive library of advertisements on the server that match the target device characteristics and factors, thus maximising the chances that the advertisements available on the device are relevant (and most likely to be clicked).

Inputs may include:
Factors received from the handset (and historic data from the handset)
Adverts from the advertisers Outputs may include a set of one or more advertisements, which are then transmitted to the client to be cached on the device.

The algorithm iterates through the advertisements on the server and builds a priority list of those that most closely match the data received from the handset. The top n advertisements (where n is the maximum cache size) are then collected and sent.

—Filter & Sort

Filter by OS Version/Device Type
This filter, typically applied first, selects the most appropriate advert for the device based on the version of OS they are using and the device type, which consists of information such as screen resolution, available screen space to show an advert, screen aspect ratio, etc.

Filter by User Country
Using the IP address or historic GPS data collected from the phone, it can be determined which country the user is in, and the adverts can be filtered accordingly according to their metadata.

Filter by User Location History
The server can use the device's location history in order to extrapolate certain patterns (e.g. commuting patterns), which can then be related back to advertising metadata.

Filter/Sort by User Advert History
The advert history consists of adverts that have been displayed (and frequency) and those that have been clicked (and frequency) for each user. Based on this information, adverts can associate (or disassociate) themselves with one another.

In addition this presents the possibility that the server can try different combinations of adverts if the current adverts have not been so successful, or can continue to show the same sort of adverts if they have been successful.

—Selection

Top N Selection
The server-side sends the top N results after the sorts have been applied, where n is a reasonable number of algorithms to be transferred over the Internet. N could also relate to the frequency of updates (i.e. the more recent the last transfer, the lower the N value).

In some embodiments the client itself defines N based on its own calculations of how many "fresh" adverts are needed, based on the expiry of algorithms or whether they have already been selected/displayed, etc. (a side effect of this being that the merge step can be omitted).

ii) Merge Algorithm

The purpose of this algorithm is to merge the new adverts received from the server with the old adverts already stored in the cache. This algorithm is run every time the client receives an update from the server.

Inputs may include:
New adverts received from the server
Old adverts retrieved from the cache
Local device factors (possibly—although the server should already be aware of most of these and would have factored them into the update).

Outputs may include a new set of adverts (old and/or new) which are then stored in the cache.

The algorithm iterates through each of the new advertisements received from the server and each of the old advertisements retrieved from the cache, filters them and sorts them into a list. Depending on the available cache size, the top n are selected.

In an alternative implementation of the system where the client is able to delete its own adverts when they are deemed to be no longer relevant, and is able to specifically request a number of new adverts from the server, the merge algorithm is not actually required: The client can simply delete N adverts from local storage, and request a new set of N adverts to replace them, without needing to merge. This also saves on bandwidth, as only the required number of adverts actually needs to be transmitted. The downside of this approach is that the client must perform more processing initially in order to determine which adverts to delete and how many slots are open.

iii) Client-Side (Selection) Algorithm

The client-side algorithm, meanwhile, decides which item of media content to select from the device local cache. It is able to do this based on real-time information such as:—

Location of the callee (via GPS)
Location (region) of the caller (via phone number)
Current date and/or time
Specific incoming and/or outgoing call events
For example, the app could use caller-based methods to display location- or situation-based information or to implement "adversarial" marketing based on sponsorship of particular factors.

In some embodiments, the media content item is selected at random.

Generally, the purpose of this algorithm is to select a single advertisement to display on the incoming call screen from the cache, based on the best available information on the device, which may include real-time information such as GPS location and factors to do with the incoming call.

—Filter & Sort

Filter/Sort by Caller Phone Number

The advert metadata specifies a list of phone numbers (or phone number regular expressions—up to some level of detail) that it should be triggered for. When the call comes in, a check is done to see which adverts should be triggered for this specific number.

The more specific the list of phone numbers (or the more concrete the regular expression) the higher position it is given in the sort.

Filter/Sort by Caller Location

The caller location can be approximated by examining the caller's area code (or international country code) and this data can then be matched with advertising metadata to determine which advert should be shown. Some adverts may only be relevant to specific countries or regions. The adverts can be sorted based on the physical proximity of the advertised content or service to the location of the caller, and then by how specific they are to a particular region.

Filter/Sort by User Location

The advert metadata provides a point and catchment radius in metres, or a 2-dimensional bounding box specified in latitude & longitude. The current GPS location data is retrieved and a check is done to see which adverts cover the current location.

The location data can either be coarse (i.e. fairly inaccurate using cell triangulation, but faster to retrieve) or fine (i.e. more accurate via GPS, but slower to determine). The adverts can be sorted by how far they are from the current location—or if their location is specified by a bounding box, then how small the bounding box is.

Sort/Filter by Date & Time

Certain adverts might be only suitable for display during specific times or dates, based on the metadata. (For example, promotions that run for a fixed time, or stores that are open at specific hours). The date and time in the advert metadata can be specified as a specific time, or a range.

Sorting is a combination of (a) the size of the date/time window (the smaller the date/time window, the higher the sorting priority) and (b) how close to the target date/time (if there is one) the user is at that moment (this can also be specified in a forward-looking only mode).

Sort/Filter by Server Factors

The client can also optionally apply many of the same filters that run on the server, such as personal browsing/call history, etc.

—Selection

Sequential Selection

An ordering is maintained for each advert, and the adverts are iterated over sequentially, which prevents the same adverts from being shown repeatedly (which can happen with Weighted Selection and Top Selection).

Random Selection

An advert is selected at random. This usually requires very robust filters to be in place, because the sorting order is ignored leaving just the filters.

Top Selection

The top-ranking advertisement is selected. This is not a good idea unless there are a large number of adverts available to choose from with a wide variety of factors.

Weighted Selection

In this algorithm, the advertisements higher on the sorted list are weighted the most, with subsequent positions on the sorted list having a probability of selection that decays exponentially.

The following is an example of the weighting and subsequent probability of selection for a list of five adverts:

| Position on List | Weighting | Probability of Selection |
| --- | --- | --- |
| 1 | 100 | 0.52 |
| 2 | 50 | 0.23 |
| 3 | 25 | 0.13 |
| 4 | 12.5 | 0.0625 |
| 5 | 6.25 | 0.032 | iv) Combination Algorithm

The purpose of this algorithm is to combine multiple filtered/sorted lists into a single filtered & sorted list from which a selection can be made.

Inputs may include:

Filtered/sorted list from each factor in the algorithm

Weights for each factor (if applicable)

Hard-coded directives, such as the position-weight decay function

Outputs may include a single sorted & filtered list of adverts from which a selection can be made.

The filtering, sorting and selection algorithmic components are specific to each algorithm (and interchangeable), but the combination algorithm is common both the client-side and server-side algorithm and consists of combining multiple sorted lists of adverts into a single sorted list, so that a selection can be made.

For example, supposing we have two factors X and Y by which we want to sort advertisements. X could be, for example, "adverts sorted by distance from the current user"—the higher on the list the advert is, the closer it is to the user geographically. Y, on the other hand, could be "adverts sorted by past history" where the higher on the list the advert is, the more suitable it is based on the user's advert history.

First of all, we can sort them by X:

| Sorted by X |
| --- |
| Advert 2 |
| Advert 3 |
| Advert 1 |
| Advert 5 |
| Advert 4 |

Then, we can independently sort them by Y as well:

| Sorted by Y |
|---|
| Advert 4 |
| Advert 1 |
| Advert 2 |
| Advert 3 |
| Advert 5 |

The result will be two, completely separate lists, which makes it difficult to select which advert would be the best one to show to the user. Even if it were desired simply to select the "top" advert, the two sorted lists will not agree on which is the "top" one.

Therefore, these two lists are combined. A combination algorithm which shows how this can be achieved is now described.

In the above examples, each advert is given a position-weight where 5 is the top of the list and 1 is the bottom. The position-weights for X and Y are then added to produce an overall weight, which then produces a new sorted list as a combination of the original lists.

| Sorted by Y | Weight for X | Weight for Y | (Weight for X) + (Weight for Y) |
|---|---|---|---|
| Advert 1 | 3 | 4 | 7 |
| Advert 2 | 5 | 3 | 8 |
| Advert 3 | 4 | 2 | 6 |
| Advert 4 | 1 | 5 | 6 |
| Advert 5 | 2 | 1 | 3 |

By taking the combined (added) weights, the following combined list is created, from which a selection can be made according to the selection algorithms described previously:

| Sorted by X + Y |
|---|
| Advert 2 |
| Advert 1 |
| Advert 3 |
| Advert 4 |
| Advert 5 |

However, this particular algorithm is heavily simplified and may not be suitable for real-world implementation. In particular:
  Both X and Y were treated completely equally. In the real world, one would probably want to weight one factor more than another.
  This algorithm only handled two factors, but it may be desirable to handle more.
  The position-weight of each advert was calculated by simple linear decay, but this could be modelled as exponential, etc. to give more weight to higher results.
  There may need to be a "tiebreaker" for handling cases where after combination, two adverts have the same weight (in this case, we simply inserted them randomly).
  This algorithm only handles cases of sorting, not filtering (although it can be assumed that filtering is simply the process of applying an unsuitable advert with a zero weight).

According to a further example, a combination algorithm is also provided, where for an advert a with 3 factors {x, y, z}:

$$w_a = w_x w_{a_x} + w_y w_{a_y} + w_z w_{a_z}$$

where:
  $w_a$ is the final position-weight of advert a.
  $w_x$ is the pre-defined relative weight of factor x.
  $w_{ax}$ is the position-weight of advert a on the sorted list for factor x.

An example flow of how the advertising selection system works end-to-end is as follows:
1. Assuming the client app has 50 adverts stored locally in the cache, and for simplicity we assume that all adverts are the same size and that the client capacity is for 50 adverts.
2. The client is informed that it is time for the periodic update with the server, so it requests an update from the server.
3. In addition to the request, the client also sends to the server information about which adverts have been shown, and which have been clicked since the last update. It also sends information about their version of Android and handset type and approximate geographical location over the last 30 days.
4. The server's advert library is then sorted and filtered by these factors and then combined into a single list on which the Top N selection algorithm is used to select the top 50 adverts.
5. The client receives the 50 new adverts, and uses the merge algorithm in order to determine which adverts to delete from the cache, and which to save—and equally which adverts to "merge in" to the cache from the server update, and which to ignore.
6. The merge algorithm completes and the client now has a set of 50 up-to-date adverts in its cache.
7. A call comes in, the client now sorts and filters the adverts from its cache both by the current user location as well as the date/time and then applies the combination algorithm to produce a single sorted list on which a weighted selection is done in order to select a single advert from the cache to present to the user.

The above is only one possible example implementation of the system.

—Software Development Kit

In some embodiments, a SDK is made available online, which developers can download to bundle this technology with their own app. The SDK bundles the client-side components, comprising the background service and app.

These components can either be bundled directly inside the third-party app package, or can be included as a separate package which is installed by the third-party app (in particular, the latter approach simplifies dealing with multiple apps on the same device using the SDK).

In the case where the software application is provided as part of a second software application, the software application may be provided as a software development kit (SDK) made available to software developers online or elsewhere. The developers of the second software application would therefore install the software application as part of their second software application using the SDK. For example, developers of a game app may use the SDK to install the software application of the present invention as part of their game app. An advantage of this arrangement to the developers is that they gain revenue by enabling advertisements of a third party to be displayed on the incoming call screens of users of the game app. An advantage to the third party (the providers of the advertisement) is that their advertisement is displayed on the incoming call screens of users who download the game app, and they may pay for this advantage according to the number of impressions of their advertisement shown (CPM), or the number of times a user selects their hyperlink (CPC), or any other means.

Generally, the SDK may offer one or more of the following features:

- distributed as a downloadable package that can be incorporated into a third-party app, referred to as the host app
- initialised using a simple API which uses an app_id to initialise the app with a unique identifier for the host app
- Upon initialisation, the SDK verifies the app_id and requests an instance_id for this specific installation of the app from the server which is then stored on the device
- Once the SDK has verified the app_id and received the instance_id, the software application (Incall) is activated on the app
- If the app cannot validate the app_id because it is rejected as invalid, then an error message is displayed and Incall is not activated
- If the app cannot validate the app_id because there is no internet connection available, then no error message is displayed, Incall is not activated, and Incall will attempt to validate the app_id next time the initialisation routine is called
- If the app cannot request an instance_id because there is no internet connection available, then no error message is displayed, Incall is not activated, and Incall will attempt to request an instance_id next time the initialisation routine is called.

Typically, the SDK is bundled with the host app; as such it is automatically uninstalled with the host app.

—Security

Click fraud is a problem encountered by all advertising networks, that is, how to establish that the "clicks" being reported to your server are actually genuine clicks, and not malicious users who have figured out how to game your system in order to report thousands of fake clicks?

There are two main ways of gaming the system:
1. developers manually clicking their own ads in order to record clicks.
2. developers determining the server's API in order to submit fake click reports.

There are ways to mitigate click fraud, however as with any network there is no 100% secure method of ensuring that clicks are genuine.

For the present system, the challenge of preventing click fraud is even greater, as the application code is downloaded and run locally on the user device (which they can exploit far more easily) and in a delayed reporting system, this is ideally done in an offline environment, periodically syncing with the server.

One way to address this is by establishing a sufficiently detailed audit trail as so to make any click fraud fairly easily recognisable.

Firstly, each click report contains the app_id. This is generated by the server and is hard-coded into the host app.

Each click event must contain an app_id which relates to the host app on the device. Therefore, the app_id can be used to establish an audit trail, to analyse click behaviours coming from a specific app.

However, the app_id is potentially a weak measure because it can easily be extracted by specialised tools to extract data (in particular, strings) from the app binary. A malicious developer could use the app_id to thousands of fraudulent clicks. Without further analysis, it may be impossible to determine whether this is one user sending illegitimately submitting thousands of clicks, or a thousand users legitimately clicking one advert each.

To mitigate the shortcomings of using the app_id alone, the instance_id is introduced as an additional measure in order to uniquely identify each instance of the app.

Upon initialisation, the SDK requests a unique instance_id from the server, and this is stored on the device for the lifetime of the app. In the event the app is uninstalled and re-installed, a new instance_id is generated, however the instance_id persists during an upgrade.

By using the instance_id, we can now determine whether the thousand clicks (from the previous example) come from one user (i.e. one instance) clicking a thousand adverts, or one thousand users (i.e. one thousand instances) clicking one advert.

However, there is nothing to stop a malicious user from generating a single app_id, 1,000 instance_ids and then submitting click reports of 1 click each. This can be mitigated by:

1. Checking the number of clicks per instance_id. If a single instance_id is generating an abnormally high number of clicks, this could be indicative of click fraud.
2. Checking the timestamps of the instance_id generations. If they were all generated in a single short burst over a very short timespan (i.e. matter of minutes), then it is likely that the instance_ids were generated fraudulently via a script.
3. Checking the IP addresses of the instance_id generations. If they were all generated from the same IP address, then it is extremely likely that the instance_ids were generated fraudulently by the same user.
4. Checking the Android app download figures directly with Google. In the event of a click fraud investigation, a developer could be asked to prove their installation figures from their Google Developer Console. If the number of instance_ids vastly exceeds the number of downloads & installations, then it is extremely likely that the instance_ids have been fraudulently generated.

Therefore, by combining the app_id with the instance_id, and also looking at the IP address of the click report (which cannot be spoofed), there is enough data to mitigate the risks associated with most common forms of click fraud.

A further example incorporates the following features:

- Using the device's IMEI number to further validate click information.
- Using triggers on the advertiser's website to validate click-throughs as being genuine.
- Using a one-time code based on the instance_id (or a server-based nonce).

Therefore, the SDK simply reports the app_id and instance_id for each click/impression, and the server stores an audit trail of app_ids, instance_ids, timestamps and IP addresses in its database in order to facilitate manual investigations and to support a possible future implementation of an automated detection algorithm.

In addition, all communication between the app and the server is secured via SSL to prevent eavesdropping and man-in-the-middle attacks.

In some embodiments, clicks are accompanied by the IP address of the source of the click, in order to make it easier to monitor for click fraud.

—Privacy

It is important that the various approaches discussed for collecting and uploading potentially sensitive user data to the server, which may include personal information, are legal and in-line with appropriate guidelines, and also that such information is properly communicated to the end-users to allow them to make an informed decision as to whether or not they wish to share their personal information.

Operation

Figure 5:
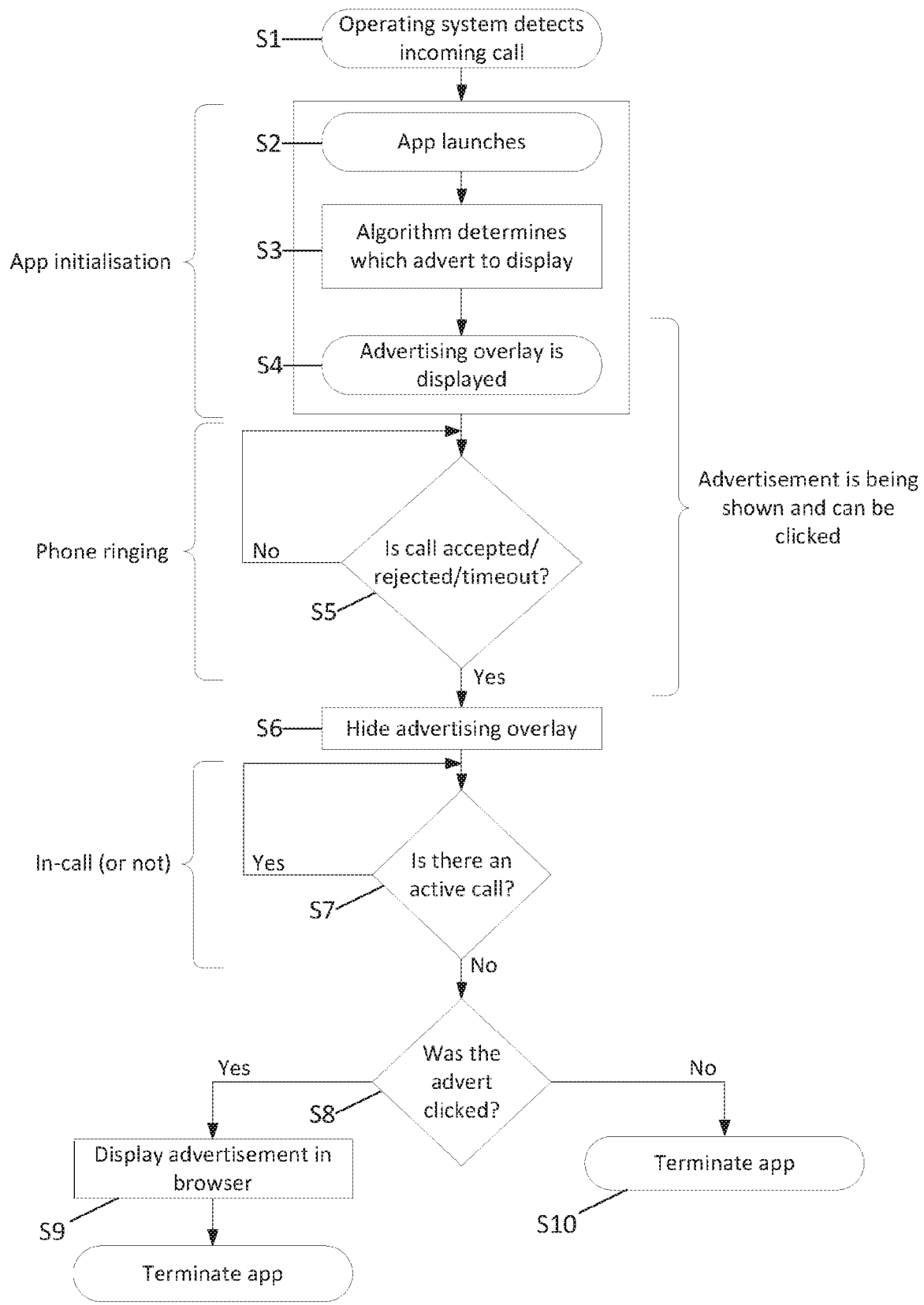
FIG. 5 shows an example implementation in flowchart form of the client application.

FIG. 5 shows an example implementation in flowchart form of the client application.

S1. When a call occurs from a second party to the user of the mobile device, an incoming call event is triggered by the operating system and the dialler sends notification 110 of the incoming call event to launch the application 100.

S2. The augmentation application 100 is launched.

S3. Algorithm determines which media content item to display

This may involve the application sending a media content request 102 to a cache 112. The cache 112 is a local store of media content on the mobile device. Upon receipt of the media content request the cache sends the media content item 108 to the application 100.

As described above, in some embodiments, the mobile device periodically accesses the remote server and downloads updated media content for downloading updatable information.

S4. Media item overlay is displayed, i.e. a view is attached to the phone's window manager and is overlaid onto the incoming call screen.

Since a call is occurring, the screen will usually be displaying an incoming call screen image or callerID 104. The application interacts with the windows manager (or other appropriate component of the operating system) of the mobile device to enable the media content to be prioritized over the incoming call screen and therefore the media content image 101 to be overlaid on the incoming call screen image 104 such that the screen 106 displays the media content image. This change in priority may be conducted by changing the respective display z-orders of the item of media content image 101 with respect to that of the incoming call screen image 104.

S5. Is the call accepted/rejected/timed out? i.e. the app waits until the call is answered or rejected, at which point . . . .

S6. The view is removed from the phone's window manager.

S7. The app remains in the background for the duration of the call.

S8. Was the media content item clicked?

S9. If yes, the user clicked on the media content item prior to accepting the call, then a browser window is opened after the call which takes the user onto a specific website. (Alternatively, this could be a different action other than opening the browser, such as dialling a number, etc.)

S10. Otherwise, the app terminates itself (and optionally reactivates itself after the call).

FIGS. 6, 7, 8 and 9 show examples of telephone call augmentation.

Figure 6:
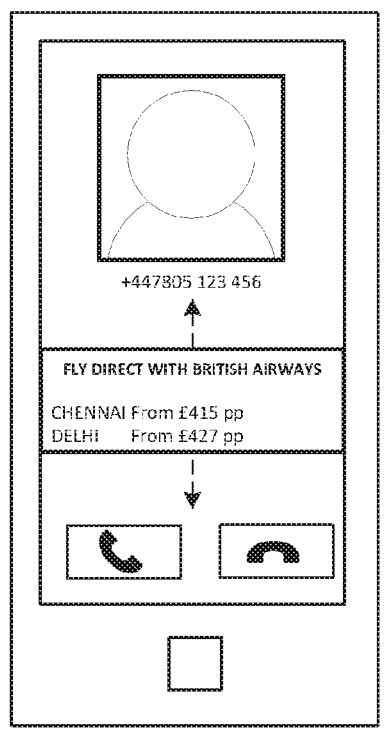
FIGS. 6, 7, 8 and 9 show examples of telephone call augmentation.

FIG. 6 shows an Overlay Example 1: Movable banner. In this example, the media content item is shown as a traditional banner ad which can be moved upwards and downwards by the user (or set programmatically) so that it does not occlude the caller information and call accept/reject buttons. It could also be horizontally/vertically resizeable.

Figure 7:
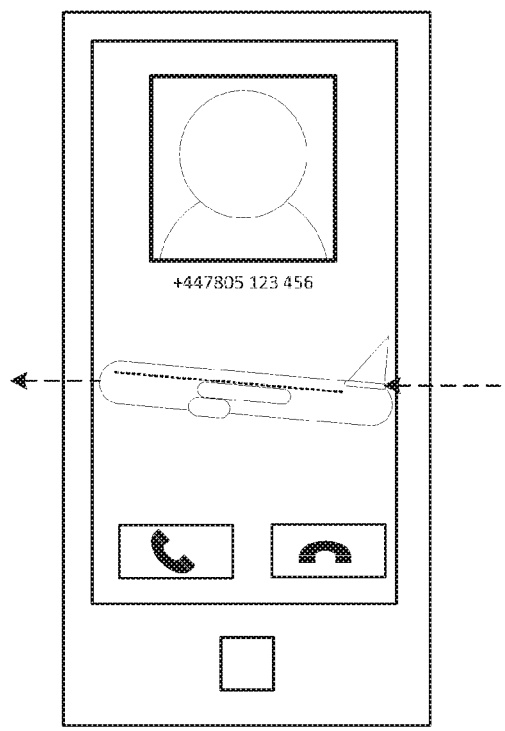

FIG. 7 shows an Overlay Example 2: Custom animation. In this example, the overlay does not necessarily need to be a rectangular shape, and indeed in many cases it would be more desirable to have the objects more fluid in order not to obscure the call screen. In this example, the media content item is shown as an aircraft which zooms across the screen right-to-left upon the incoming call.

Many different shapes or types of media (image/video/3D animation, etc.) that can be displayed on the screen, e.g. a cereal box which appears from the bottom of the screen, propelling cornflakes all over the screen.

Figure 8:
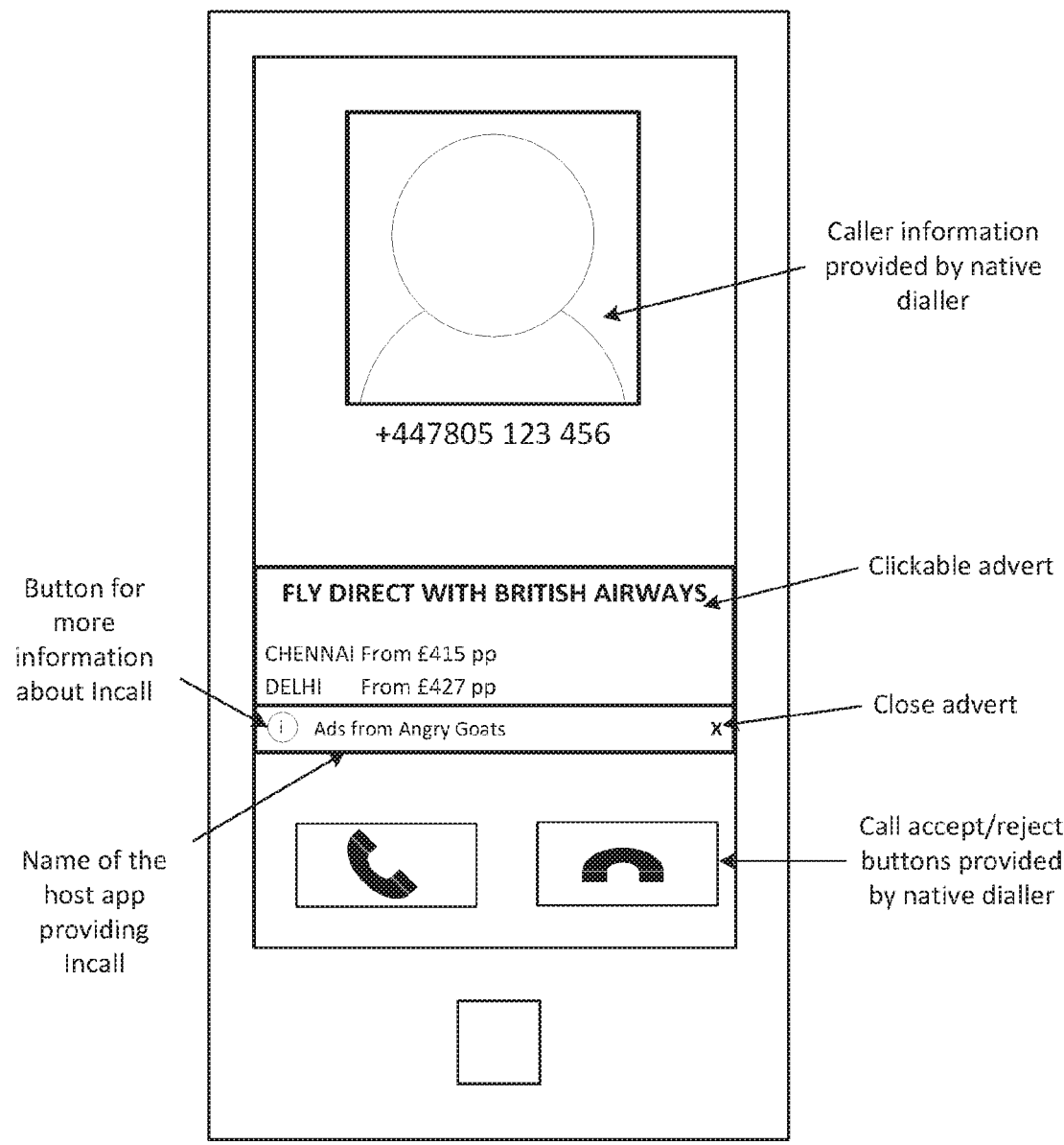

FIG. 8 shows a further example, showing the overlay/media content item with "host" app origin, further information and 'close' buttons. User clicks on the media item in the immediate vicinity of the close button may in some embodiments be interpreted as 'near-miss' attempts to close the overlay.

Figure 9:
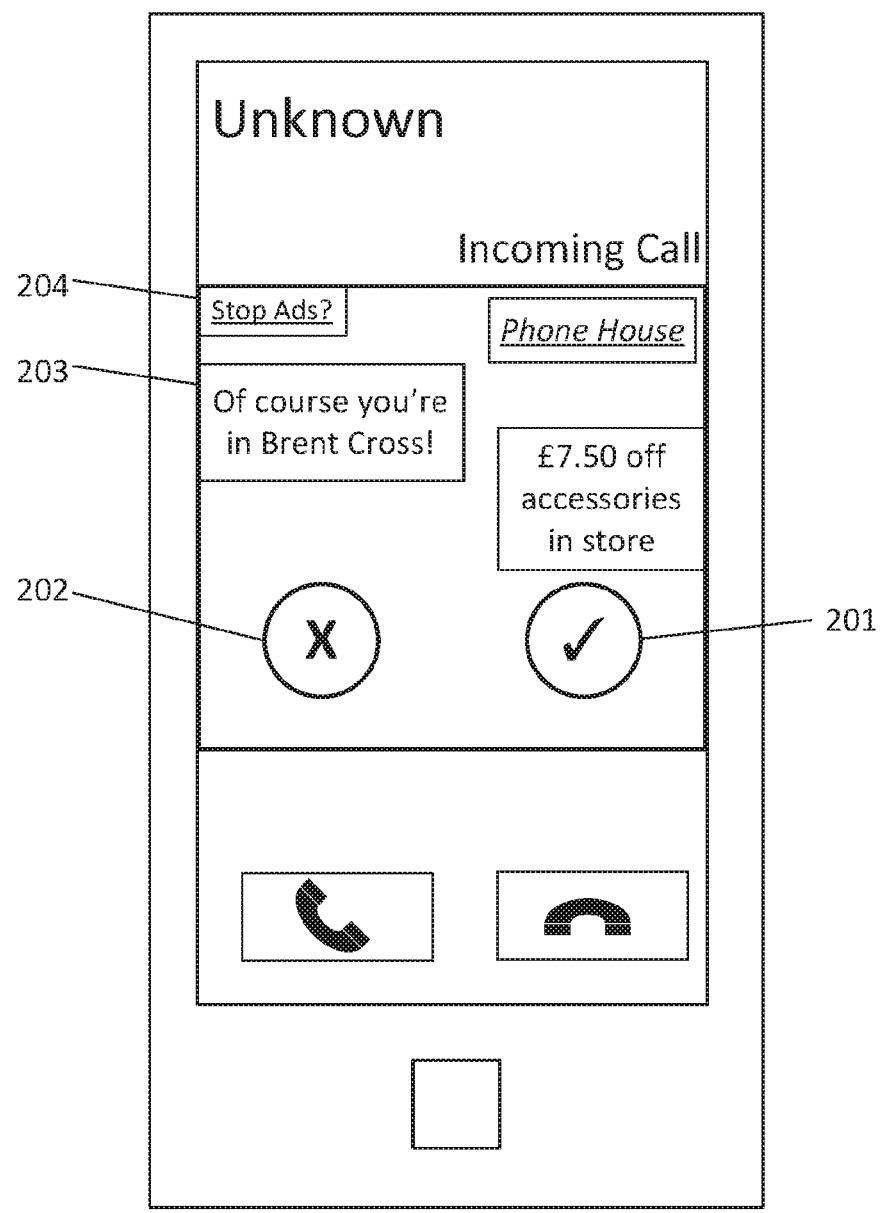

FIG. 9 shows an overlay example for a limited offer, showing the overlay/media content item with tick and cross buttons 201, 202, an indication of location 203 and "Stop Ads?"/'close' button 204. This example is particularly useful for offers which are specific to a particular location or time. The user may take up the offer by pressing the tick button 201, or reject it by pressing the cross button 202. Pressing the "Stop Ads?" button 204 may redirect the user to a page where they can purchase a premium version of the developers' application which does not include the bundled SDK.

—Delay Feature

In a preferred embodiment, the media content item comprises at least one hyperlink with a delay feature, such that when a user selects (or "clicks") the hyperlink before answering a call, or during a call, the call is not interrupted and the user's viewing of the destination website, webpage or URL defined by the hyperlink is delayed until the end of the call. Upon ending the call, the mobile device screen displays the website at the destination specified by the hyperlink.

In some embodiments, the destination page may be "pre-loaded" by being navigated to in the background during the call by the browser of the mobile device.

Alternative implementations of the delay feature include:
immediate navigation to and display of the destination, but the incoming call screen, or the displayed part of the incoming call screen, may still be accessible and usable only the portion of the screen displaying the media content item immediately displays the destination website; the rest of the screen may display the destination website only at the end of the call selecting or clicking the hyperlink may both cause the browser to navigate to and display the destination website, and answer the call. In this case, navigation to and/or display of the destination website may be immediate or delayed until after the call. An advantage of this is that the user can, with one selection, answer the call, and navigate to the desired destination website. The destination website will either stay on the screen until the end of the call or be displayed at the end of the call, at which time the user can view it.

Android Implementation

Depending on the specific operating system in question, the components, implementation and terminology may differ slightly from platform to platform. The description used in this document is based loosely on the Android paradigm. A basic prototype which provides an incoming call screen overlay on the Android platform will now be described.

1. The app registers a BroadcastReceiver to receive the android.intent.action.PHONE_STATE intent with maximum priority.

2. When the intent is received by the BroadcastReceiver, the TelephonyManager.EXTRA_STATE information is retrieved from the intent's extras.
3. If the state is equal to TelephonyManager.EXTRA_STATE_RINGING, the app starts a new Service.
4. Upon starting, the Service gets the WINDOW_SERVICE system service and adds a new View with the relevant content. It also registers itself as with a new IntentFilter to receive a custom IDLE_STATE action.
5. The Service also handles updating the view with the relevant media content, along with any user interaction (e.g. clicking).
6. When the BroadcastReceiver receives a further intent with the TelephonyManager.EXTRA_STATE intent equal to TelephonyManager.EXTRA_STATE_IDLE (i.e. the call has been accepted or rejected) then a new intent is sent with the IDLE_STATE action.
7. The Service receives the IDLE_STATE action and terminates itself.

In order to capture the post-call event (in order to display the media content, if it was clicked), the prototype can be extended to maintaining a boolean on the Service of whether the media content item was activated or 'clicked'.

It is also possible to retrieve not just the current state from the intent on the BroadcastReceiver, but also to compare it to the previous state (which was earlier stored, as the BroadcastReceiver is triggered independently each time the android.intent.action.PHONE_STATE intent is received) in order to determine when the call has ended.

A more complete implementation uses a background service and caching system for the media content, along with the relevant algorithm to select the most appropriate item of media content.

Different versions of Android place the call accept/reject buttons differently, and OEMs have the ability to replace the incoming call screen with their own alternatives (e.g. HTC's Sense & Samsung's TouchWiz). Therefore, the media content item screen overlay is placed and sized differently according to each handset and version of Android in order to ensure that the caller ID and accept/reject buttons are accessible. The app is therefore customised for compatibility with each version of Android and each handset.

Support for Multiple Parties

The SDK may also facilitate deployment from multiple third-party apps.

The challenges this poses are as follows:—
1. The call screen is generally only capable of displaying one item of media content per call, therefore the deploying apps must cooperate (or indeed compete) to ensure that only one item of media content is shown at a time.
2. There needs to be a fair way of distributing the revenue between the multiple third-parties.

In other words, each time a call comes in, there is one media display slot on offer, and therefore the client-side app must introduce an additional selection stage in order to decide which media content item is selected for display.

A number of example approaches that are used to handle multiple apps deploying the call-handling facility on the same device are described below (those models which only work in a CPM scenario are labelled accordingly):

(As previously, CPM or cost-per-mille refers to the number of times the media item is shown; CPC or cost-per-click refers to or the number of times a user selects the associated hyperlink).

—Monopoly Model (CPC/CPM)

The monopoly model is both the simplest and least fair: the first app which uses the SDK is granted all media display slots on the device, to the exclusion of any other apps that may be installed at a later date.

If an app tries to activate the media content display and another app using the SDK is already installed, the app will be informed that the activation failed, and instead would be forced to provide some other means of media display (or forgo media display entirely).

—Sequential Model (CPM)

In the sequential model, the SDK maintains a list of all third-party apps which use the SDK. When a call comes in, the SDK cycles through each app displaying an item of media content pertaining to a specific app, one per call giving each app one slot in turn.

—Probabilistic Model (CPM)

In the probabilistic model, the SDK maintains a list of all third-party apps which use the SDK. When a call comes in, the SDK selects one at random from the list and displays it.

—Financial Distribution Model (CPC/CPM)

In the financial distribution model, all of the CPC/CPM proceeds are put into a central pot which is then divided between the apps installed.

—Bid Model (CPC/CPM)

In the bid model, each media content provider (or app developer) "bids" for the media display slot through an automated auction system.

Generally, Incall is provided as a SDK (Software Development Kit) in the form of a source code component that is bundled with third party apps in order to provide pre- and post-call advertising.

Each Incall-enabled app is packaged with the SDK before distribution within, in the example of an Android OS, an APK (Android Package) file, therefore each enabled app has its own separate copy of the SDK (which is referred to as a separate "instance" of Incall).

The SDK has three key functions:
1. To intercept the incoming call screen to add advertising and to detect when the call has been ended to display the post-call advertisement.
2. To periodically sync with a central server to retrieve a fresh set of advertisements to display to the user.
3. To report back to the server the number of clicks and impressions for each advert.

The syncing function of the SDK may allow a media content provider to bid for media display slots and quickly supply their media content to users.

Although there may be multiple instances of Incall on a single (Android) device (due to the presence of multiple enabled apps), only one instance of Incall should be responsible for the above three functions. If each instance were to act independently with no co-ordination between them, then the result would be:
1. Multiple instances would conflict with each other when trying to add adverts to the call screen. The likely outcome would be that multiple adverts would be shown on top of one another.
2. Multiple sync events would take place, which would consume data allowance and battery.
3. Clicks and impressions would be reported inaccurately: due to conflicting instances of the SDK, they might be recorded multiple times, or not at all.

An algorithm is accordingly provided to allow multiple instances of Incall to coordinate with one another so that a single ("master") instance of Incall is responsible for displaying the adverts, syncing with the server and reporting the clicks and impressions.

The algorithm incorporates also the following features:
- Allow inter-instance communication so that the other ("slave") instances are able to contribute app metrics to the master instance for transmission to the server
- Be decentralised so that there is no reliance on any third-party components (which could be uninstalled) or shared log files (which could be removed or tampered with)
- Give precedence to instances of Incall that are a more recent version.
- Switch instantaneously (or at least minimise any delay) in switching between instances so that Incall is continuously active on the device.
- Be invulnerable to outside apps interfering with the master/slave coordination process.

The following three different example algorithms for master/slave coordination are described below (in overview and using pseudo-code):
  i) intent-driven algorithm
  ii) log-driven algorithm
  iii) server-driven algorithm
  A further option iv) is also described.

Once multiple instances are able to coexist, coordinate and cooperate on a single device, business logic is used to divide the revenue from clicks and impressions between the multiple instances.

i) Intent-Driven Algorithm

The intent-driven algorithm uses Android intents to provide a decentralised method of coordinating between multiple Incall instances.

The Android documentation describes an Intent as "an abstract description of an operation to be performed." Intents are commonly used either locally to trigger events between different components of an app, or system-wide to communicate between multiple apps. Put simply, an intent can be thought of as a sort of message which can be sent from an app to all other apps on the device. For example, the intent
  android.intent.action.VOICE_COMMAND
is sent when an app wants to start accepting voice commands. Android has built-in support for voice commands, but by registering and responding to this intent, other third-party apps can receive them too and offer to provide voice command services.

In the intent-driven algorithm, system-wide broadcasted intents are used in order to facilitate communication between slave instances and their master. An intent is in effect an "event broadcast". One app (strictly speaking, a component of an app), sends out the intent, and any other apps (strictly speaking, components of those apps) which are registered to receive that intent will pick it up and can take action accordingly.

Advantages:
  Technologically elegant.
  Decentralised.
  Using intent "extras" it's possible to attach an additional payload to the intent which makes it easy to collect metrics from other Incall-enabled apps by passing the metrics as intent extras.
  Intents are event-driven, so no need for polling.
Disadvantages:
  Using system-wide intents, there is no way to prevent a malicious third-party developer from triggering their own intents and disrupting the natural application flow.
  Void period when transitioning instances caused by waiting for intent interval.

In terms of implementation, upon installation, each instance of Incall by default starts in slave mode (unless it has previously recorded itself as being a master instance in preferences), and registers a BroadcastReceiver to receive a com.getincall.HEARTBEAT intent, sent by a master instance to inform the slave instances that it is active.

It then also defines a variable sleepTime which is a random number in the range heartbeatInterval+1 to maxSleepTime.

heartbeatInterval and maxSleepTime are constants defined as follows:
  heartInterval is the constant, pre-defined time between "heartbeats". The com.getincall.HEARTBEAT intent must be activated once every heartbeatInterval by the master Incall instance to tell the slaves that it is still active on the device.
  maxSleepTime is the constant, pre-defined maximum time that should be allowed to elapse without any master Incall instance asserting itself.

It is desirable that maxSleepTime−heartbeatInterval>10000 to ensure a sufficient number of random variations for the sleep timer, thus staggering when each instance wakes up to ensure that two instances don't wake up at the same time and both try to become masters simultaneously.

If (and each time) the com.getincall.HEARTBEAT intent is received, sleepTime is reinitialised to a random number in the range heartbeatInterval+1 to maxSleepTime and the instance stays in slave mode. This is because if a heartbeat is detected, then there must still be an active master instance on the device.

If the heartbeat is not received, or if the app starts and reads from preferences that it is the master, then it takes over all the Incall responsibilities on the devices, such as displaying ads, syncing and reporting. It also registers a BroadcastReceiver to receive the com.getincall.RESIGN_MASTER intent, which can be broadcast by any slave instance in order to force the resignation of the master instance (for example, to enforce version precedence) at which point it returns to a slaved state.

An example implementation is as follows:
1. An Incall instance is installed on the device. It begins in slave mode, listening for a heartbeat over a random interval.
2. No heartbeat is received in that interval, so it now becomes the host and starts broadcasting a heartbeat every heartbeatInterval.
3. Incall instance B is now downloaded and installed on the device, and it too begins in slave mode.
4. Because B keeps receiving the heartbeat from A within its sleepTime interval, it stays in slave mode.
5. Incall instance C is now also downloaded and installed on the device, also beginning in slave mode.
6. Because C also receives A's heartbeat within its (random) sleepTime interval, it too will stay in slave mode.
7. At some point, A is now uninstalled from the device, causing its heartbeat to stop.
8. Because sleepTime$_B$≠sleepTime$_C$ (since they were both chosen randomly), either B or C will "time-out" before the other.
9. In this example since sleepTime$_B$<sleepTime$_C$, B's timer ends first, so it now becomes the master and broadcasts the heartbeat, which is received by C which then continues to run in slave mode.

As pseudo-code:

```
const HEARTBEAT_INTERVAL = 1800000 // 30 minutes
const MAX_SLEEP_TIME = 2400000 // 40 minutes
```

```
heartbeatReceived = false
isMaster = false
function onFirstRun( ) {
    onBoot( )
}
function onBoot( ) {
    isMaster = preferences.read("isMaster")
    if (!isMaster) {
        becomeSlave( )
    } else {
        becomeMaster( )
    }
}
function onIntentReceived(intent) {
    if (intent == "com.incall.HEARTBEAT") {
        heartbeatReceived = true
    } else if (intent == "com.incall.RESIGN_MASTER") {
        becomeSlave( )
    }
}
function becomeSlave( ) {
    isMaster = false
    preferences.write("isMaster", false)
    register_to_receive("com.incall.HEARTBEAT")
    do {
        heartbeatReceived = false
        var sleepTime = rand(HEARTBEAT_INTERVAL+1, MAX_SLEEP_TIME)
        sleep(sleepTime)
    } while (!heartbeatReceived)
    becomeMaster( )
}
function becomeMaster( ) {
    isMaster = true
    preferences.write("isMaster", true)
    register_to_receive("com.incall.RESIGN_MASTER")
    do {
        sleep(HEARTBEAT_INTERVAL)
        broadcast_intent("com.incall.HEARTBEAT")
    } while (isMaster)
}
``` ii) Log-Driven Algorithm

The log-driven algorithm is similar to the intent-driven algorithm, but instead of using a decentralised algorithm and waiting for real-time intents, it instead polls shared log file to coordinate between the multiple Incall instances.

Advantages:

Simple—just a single shared file text file needed.

Traceable—can be used to store a record of installations/uninstallations.

Disadvantages:

Log files must be stored outside of the app directly (i.e. not in Internal Storage), leaving them open to user/other app tampering or deletion.

If log file is stored on SD card and the card is ejected, the log is lost.

Must poll log file on disk which is inefficient (wastes CPU and battery).

Void period when transitioning between master instances caused by polling interval.

Regarding implementation, upon installation, the Incall instance checks for the presence of the log file and begins reading it from top to bottom. If there is no log file, one is created and the current instance records itself as the master and writes to the log.

Each instance still uses a randomised sleepTime variable like in the intent-driven algorithm, but the range is from minPollingInterval+1 to maxPollingInterval where maxPollingInterval−minPollingInterval>10000 to ensure a wide number of values to ensure staggered polling between each instance.

The master app is responsible for writing an entry into the log file every minPollingInterval. Therefore, if after minPollingInterval+1, no update has been made to the log file, then similar to the heartbeat in the intent-driven algorithm, this would be evidence that the master instance is no longer running on the device, and clears the current instance to upgrade itself to master status.

An example implementation is as follows:

1. At time 18877180, Incall-enabled app A (package name com.alpha.A) is installed on the device and writes to the log file every minPollingInterval=100000.
2. Another Incall-enabled app B (com.alpha.B) is installed on the device and starts polling the log file at randomised intervals within the above specified range.
3. At time 19189243, A is uninstalled from the device, which means that its last log entry is at 19177180. The log file looks like this:

| Time | Master instance package name |
|---|---|
| 18877180 | com.alpha.A |
| 18977180 | com.alpha.A |
| 19077180 | com.alpha.A |
| 19177180 | com.alpha.A |

4. When B finishes sleeping and next polls the log file (which happens to be at time 19178465), there has been no update from A, and so B is able to upgrade itself to master mode.
5. B then updates the log file every minPollingInterval=100000, which means that continuing directly from above, the next entries in the log file appear as follows:

| | |
|---|---|
| 19178465 | com.beta.B |
| 19278465 | com.beta.B |
| 19378465 | com.beta.B |

At some point it is necessary to prune the log to avoid it becoming excessively long (this can be done after just a single entry, as it is not necessarily required to maintain a long and detailed history).

The above does not take into consideration: (a) contribution of any metrics or extra information from the slaves to master instance, and (b) decisions based on version numbers, etc. For this reason, the intent-driven algorithm may be a more flexible and decentralised alternative to the log files algorithm.

The pseudo-code is similar to that for the intent-driven algorithm, only writing to the log file instead of a heartbeat, and polling at random intervals instead of waiting random intervals for intent broadcasts.

iii) Server-Driven Algorithm

The Server-Driven Algorithm involves each instance interrogating the Android OS for the installed apps and monitors for installations, uninstallations and upgrades and then communicates that information to a server (via an API) and the server then informs each instance whether it should be a master or slave.

Unfortunately, Android does not allow an app to detect when it is about to be uninstalled by the user, or take any actions when the uninstall itself takes place. However, all apps can retrieve a list of the package names of currently installed on the device, and all apps other than the one being installed/uninstalled/upgraded can listen for the following intents:

android.intent.action.PACKAGE_ADDED
android.intent.action.PACKAGE_REPLACED
android.intent.action.PACKAGE_REMOVED Each Incall instance sends these package names to the server (which maintains a list of package names which are enabled, ordered by precedence) and the server then responds to each instance whether it should be a master or slave.

Advantages:
Instant switching between instances, because this approach is event-driven by monitoring for the actual package install/upgrade/remove operations (and therefore more efficient), there is no need for polling.
Because decisions are made by the server rather than on the device itself, it would be very difficult for a malicious third-party app to interfere with this process.

Disadvantages:
Entire app package list must be sent to the server, which could be a privacy concern (could send package hashes instead, but this would still be a privacy issue).
Server must maintain list of package names, versions, precedence, etc. which requires extra server-side logic.
Internet connection is required to determine mode each time a package operation takes place.

In terms of implementation, the app registers to receive the intents
android.intent.action.PACKAGE_ADDED
android.intent.action.PACKAGE_REPLACED
android.intent.action.PACKAGE_REMOVED
in order to check when the package list changes, and also immediately sends the package list to the server along with the name of the current instance's package name.

The server then cross-references this information against its stored package list, ignores any packages which are not Incall-enabled and uses a priority list to report back to each instance whether they should be the host or not.

Since each Incall instance on the device carries out these identical steps, it is not necessary for the server to actually maintain any state for each Incall instance, only to maintain an ordered package list of all Incall-enabled apps.

An example implementation is as follows:
1. A (com.alpha.A) is installed on the device (which is an Incall-enabled app). It registers to receive the package add/replace/remove intents, and then sends its package list to the server, which consists of [com.magnum. Fighter, com.facebook.Facebook, com.alpha.A] along with its own package name (com.alpha.A).
2. The server receives the instance package name and full package list and cross-references it against its own package list.
3. In this case, com.alpha.A is the only installed app which is an Incall instance, so the server API responds telling the app to become the master.
4. At some point in the future, a second Incall-enabled app B (com.beta.B) is downloaded and installed on the device.
5. At this point, the android.intent.action.PACKAGE_ADDED intent is received by A, which fires off a server request with the new package list [com.magnum.Fighter, com.facebook.Facebook, com.alpha.A, com.beta.B] to the server.
6. At the same time, B is initializing, so it also sends its package name and the same package list to the server.
7. B incorporates a newer version of Incall (we can assume that the app version is sent along with the package name), so com.beta.B is higher on the server's priority list than com.alpha.A.
8. Therefore, the server responds to A telling it to become a slave, and to B telling it to become the master.

In pseudo-code:

```
isMaster = false
function onFirstRun( ) {
    register_to_receive("android.intent.action.PACKAGE_ADDED")
    register_to_receive("android.intent.action.PACKAGE_REPLACED")
    register_to_receive("android.intent.action.PACKAGE_REMOVED")
    determineMode( )
}
function onBoot( ) {
    // Do nothing
}
function onIntentReceived(intent) {
    determineMode( )
}
function determineMode( ) {
    packages = Device.getPackages( )
    response = API.call("packages", [App.packageName( ), packages])
    if (response == "master") isMaster = true
    isMaster = false
}
``` iv) On-Boot Intent

In this alternative, when the device boots up (or when a new instance is installed), all apps broadcast intents and the system then automatically gives precedence to the latest version of Incall (or some other rule to ensure a consistent precedence between all instances).

—Allocation of Revenues

In order to resolve the problem of how to allocate advertising revenues per impression/click-through at each incoming or outgoing call event between n developers when n incall/outcall SDKs are installed on a given handset, the following algorithm is provided.

Incall uses an algorithm which takes as inputs handset and SDK Application (this is an application on a given handset which contains the incall/outcall SDK) end user metrics. Parameters are also defined which assign a weighting to each metric. This weighting and the input metrics are then used to calculate a score for each SDK application on a given handset and then allocate advertising revenue.

The algorithm is continuously optimised to ensure an efficient, fair, and commercially viable distribution of funds across SDK Applications.

An example list of inputs to the algorithm—specifically to allocate revenue—is as follows (assuming that all of the required user/phone identification metadata is available and accounted for):

Date/time when host app was first installed
Date/time when host app was last run
Total duration of host app running
Frequency of host app launches
App category
History of ad impressions (and factors associated with those historic ads, if you choose to store them)
History of ad clicks (and factors associated with those historic ads, if you choose to store them
App rating
App download numbers (very approximate)
An example weighting output is as follows:

For two Host Apps on a single device, £100 pounds of revenue to allocate
Total Duration of App run time = 75% weighting
Total of launches = 25% weighting -continued

| | | | App | |
|---|---|---|---|---|
| App A: | 10 hours | | 100 launches | |
| App B: | 2 hours | | 500 launches | |

Calculation:

| | Weight | App A | App B | A + B |
|---|---|---|---|---|
| Duration | 0.75 | 10 | 2 | 12 |
| Launches | 0.25 | 100 | 500 | 600 |

| | Weight | A % of A + B | B % of A + B | A weighted | B weighted |
|---|---|---|---|---|---|
| Duration | 0.75 | 0.83 | 0.17 | 0.63 | 0.13 |
| Launches | 0.25 | 0.17 | 0.83 | 0.04 | 0.21 |

| | A Total | B Total |
|---|---|---|
| Duration | 62.50 | 12.50 |
| Launches | 4.17 | 20.83 |
| TOTAL | 66.67 | 33.33 |

Alternatives & Modifications
—App Tokens
In some embodiments, "app tokens" are used instead of "API keys" to allow the association of clicks with (host) apps (of which a developer may have many), rather than clicks for each developer.
—Input Metrics
Broadly speaking there are three types of algorithmic inputs (or metrics):
1. Point-in-time metrics—these are acquired at the time an incoming call event occurs, and involve the app being brought to the foreground capturing various data, primarily the incoming call number, but also other data such as GPS information.
2. Long-period metrics—this is collected over longer time periods. The app may, for example, install a background service to, say, periodically check GPS coordinates. Alternatively, the app may use the call log to determine what numbers have been called or from what numbers calls have been received.
3. Personal metrics—this comprises information which is collected from personal data in the phone itself, such as the phone directory, or text messages.

The metrics acquired are those which may be used to better select the media content item(s) to present to the user. Some embodiments may however also collect and make use of more esoteric information, such as that acquired from accelerometers.

Examples of metrics include:
General
  Current date/time
  Current phone number on the device (if verified—ideally there should be an SMS verification process to prove the number is valid as getting it from the device programmatically may be unreliable)
  Device operating system and version
  Device model and manufacturer
  IP address(es)
Location Services
  GPS location (current)
  GPS location traces/history (this may be collected in background, preferably infrequently so as not to drain the device battery)
Incoming Call
  Phone number (this can also be cross-referenced against the call log)
  Country/region/area of caller (derived from phone number)
  Whether the number is in the user's contact list or not.
Call Log
  Numbers of callers and callees historically
  Date, time and duration of calls (also frequency)
Host App Information (the app which is "hosting" the augmentation app)
  Date/time when host app was first installed
  Date/time when host app was last run
  Total duration of host app running
  Frequency of host app launches
  Any other developer-defined metrics fed out from the host app (can leave up to developer to decide, for example this could include app category, etc.)
SDK Information
  History of ad impressions (and potentially factors associated with those historic ads)
  History of ad clicks (and potentially factors associated with those historic ads)
  Other metrics defined by the system (for example, advertisers could pay more for a higher "priority" metric)
App distribution system metrics (can be retrieved by scraping the site)
  App rating
  App download numbers
  App category
—Display Options
When the item of media content is overlaid onto the dialler when an incoming call is received, there are many possible options for how the media content is displayed, including for example one or more combinations of the following:
  only part of the incoming call screen image is overlaid such that the caller ID can still be viewed and the call can still be answered and interacted with in the usual manner
  the entire incoming call screen image is overlaid and call interaction and ID functions may be provided within the media content image
  the item of media content replaces, rather than overlays, the incoming call screen image
  the item of media content modifies the incoming call screen image to enable display of the media content alongside, embedded in, or in any other way along with the incoming call screen
  the media content item may be partially transparent, allowing an animated shape to move across the screen while the rest of the incoming call screen, the space outside of the animated shape, remains visible to the user
  the media content item may be implemented as an overlay as a floating, resizeable (within limits) view that can be customised to the user
  a customised caller ID system is implement as part of the media content overlay, potentially leaving only the call accept/reject buttons unchanged Where it is not possible to have the overlay cover the entire screen (for example, because APIs are prevented from overriding the default call accept/reject actions) the media content item display is implemented as a floating overlay which covers only part of the screen and leaves the call accept/reject buttons exposed.

—Media Item Ordering

The items of media content may be sent from the application to be displayed on the screen one by one—in a specified order, or selected at random, or in a combination of random and specific or prioritized order using any algorithms—or multiple items may be sent and displayed on the screen at once.

—Audio Media

It is also possible to add a custom ringtone or sound effects to the overlay, which can either supplement the device's ringtone, or replace it entirely. That is, where the item of media content comprises an audio clip such as music, speech or any audio file, which may or may not be accompanied by an image or video clip, the audio clip is played by the loudspeaker in place of the usual ringtone played by the mobile device upon receipt of a call. The ringtone may be intercepted, replaced, overlaid, delayed until after the audio file, or otherwise interrupted.

—Cache-Less Devices

In some embodiments there may be no local cache and the phone may remotely download at least one item of media content from the server upon each media content request. It will be appreciated that it may take longer to first download and display an item of media content than it would to display one stored locally.

—Outgoing Calls

In another embodiment, media content is displayed when the device user makes an outgoing call to a second party. In this case, the operation is as described above with the exception that the notification sent by the dialler to the application is sent upon occurrence of an outgoing call event rather than an incoming call event, and the image overlaid by the advertisement is the outgoing call screen image and/or presented when the outgoing call is completed, say for a present amount of time. This functionality may be provided within the same SDK as described in relation to the system for processing incoming calls. In some embodiments, the outgoing call feature may be linked to the incoming call feature; hence the incoming and outgoing call screen images may also be related.

—Syncing

The system maintains two separates databases—the main database on the server side, and a smaller database on the phone (cache) which stores a subset of adverts to display to the user.

Periodically, the two caches are "synced" whereby the client purges its cache and acquires fresh media content items from the server.

In some embodiments, the sync time is kept short. This may not be an ideal solution in all circumstances as sync events are not guaranteed e.g. a user may be roaming and have their data connection turned off etc.

Furthermore, because the server-side database can be edited in real-time and the client-side database only fetches those updates periodically, there are cases where the two databases can end up out of sync. For example, if the server has items {A, B, C, D, E, F, G}, the client downloads adverts {B, D, G} into its cache, but then the owner of B logs into the online system and deletes advert B from the system. This is handled in the following possible ways:

1. B is not fully deleted from the server-side (no items are ever fully deleted), instead the item is just flagged as "inactive". Until the next sync, item B is still shown as usual, and even clicking on B will take the user to B's website, but the click is not actually recorded in the database and therefore the owner of B is not charged, although has free advertising—while the developer makes no money.
2. When B is deleted from the server-side, as before it is flagged as inactive. When the user clicks the advert, the system checks if the advert is active. If it is flagged as inactive, the advert is not loaded and no click is recorded. This also provides B with free advertising (even though the ad cannot be clicked, it still appears on the handset).
3. As a variant of 2), if an advert is clicked which is found to be inactive, it is deleted from the cache and not shown again. This gives B one free click per user, and even though the target URL is not loaded, B is still getting free impressions.

The situation where an advertiser edits their advert (rather than deleting) is less problematic, but they will need to wait for their edits to propagate through the entire Incall userbase, as there is no way of pushing updates to the users—rather, the update will only take place once the periodic sync takes place.

In some embodiments, rather than have a feature to delete ads from the system, instead each advert just has an expiry time which is part of the advert. Therefore, when the client sync with the server it gets the expiry time of each ad, which means that adverts can expire locally without needing to wait for the next sync (because the phone can always check the advert expiry time against the phone's current time).

Therefore, once an advertiser sets an expiry time for their item, that expiry time is locked and cannot be changed. The clients will then start downloading the ad and the ad will expire at that time. Of course, the expiry time can then be extended (and on the next sync, the expiry will be extended on the client too), but the expiry time cannot be shortened (because we cannot guarantee that there will be a sync event between now and whenever the earlier expiry date is.)

The only vulnerability in this is that technically speaking the user can adjust the time/date on their phone which may result in some anomalous outcomes.

—Reporting/Feedback

In some embodiments, the user interaction with the displayed item of media content is reported to a remote server, either in real-time or stored and reported periodically. This feedback may assist in distributing revenue to advertisers and developers.

The system can either be used to track clicks only, or to track clicks and impressions, depending on whether a delayed reporting model, or live reporting is used. The difficulty with tracking impressions is that this data must be stored locally and then transmitted at a later date. Variants track impression data or only clicks.

As shown in FIG. 9, the media content may include two or more buttons, one of which can be used to take up a presented offer and one of which can be used to reject this offer. In this case, the clicks on each button are tracked separately. This feedback may assist in providing user response to offers.

i) Delayed Reporting

In the delayed reporting model (which works well for impressions, and also removes the need for a redirect page), all of the tracking is done locally on the device, and an aggregated report is periodically pushed to the server.

The problem with this approach is that it makes the system more vulnerable to click fraud, and is also more technically challenging to implement.

The SDK locally stores information about which advertisements have been served (impressions) and which have been clicked The SDK periodically pushes to the server a JSON-encoded click report which contains the following information:

Authentication information & meta-data about the app and report (necessary to establish an audit trail)
Detailed click report The report is JSON-encoded and pushed to the server API via a SSL secured connection The authentication information includes the "app ID" (in order to trace clicks back to their host apps for payment purposes), along with the "instance ID" (which tracks the clicks for that specific user)

The detailed click report shall consist of the date range for the current report, and also include a list of each advertisement and how many times it has been clicked:

|  | Impressions | Clicks |
|---|---|---|
| 10012 Virgin Atlantic | 4 | 2 |
| 10048 Coca Cola | 3 | 0 |
| 10078 Nike | 2 | 0 |
| 10102 T-Mobile | 8 | 1 |

An example of a JSON-encoded click report is as follows:

```
{
    "app_id":"jMnwWXmmaOqp",
    "instance_id":"yUXnsqoIqw",
    "report_id":7
    "report_from":1355213918,
    "report_to":1355925596,
    "metrics":{
        10012:[4,2],
        10048:[3,0],
        10078:[2,0],
        10102:[8,1]
    }
}
```

The click report is sent from the SDK to the server at periodic intervals, when an internet connection is available Once the click report has been successfully delivered from the SDK to the server, the local click data is purged and the local click data store is reset.

ii) Live Reporting

In a live reporting system, when an advert is clicked the user is not sent directly to the advertiser's site, but is first sent to an Incall-controlled redirect page (along with the instance_id to prevent click fraud—or preferable, a one-time code based on the instance_id), where the click is recorded in real-time, and the user is then seamlessly redirected straight on to the advertiser's page.

1. User clicks advert
2. User is taken to redirect page and click is recorded.
3. Redirect complete, user is now on advertiser's page This is a more tried-and-tested approach, and the main advantages of this approach are that it is more difficult (and less effective) to try and commit click fraud on this type of system and also that all click information is available in real-time. It also means that the advertisers can adjust which page their advert links to by editing the redirect on the server rather than having to push out a new set of adverts.

To prevent replay attacks (which could result in click fraud) I would suggest that rather than use the instance_id, a one_time_instance_id is used which is generated from the instance_id—we need to discuss this in due course (it may also require changes to the database schema).

When an advert is clicked, the SDK shall direct a user to the appropriate hardcoded redirect site, along with the ad_id and one_time_instance_id.

The redirect page shall then validate the one_time_instance_id and log the relevant click.

The redirect page shall then redirect the user on to the advertiser's target web page based on the ad_id.

—Third-Party App Integration

In some embodiments, the app (and/or SDK) is configured to allow (permitted by contract) third parties to integrate the call-augmentation features within their own app as installed on user devices. Hence, when a call is received by the user device from the company, the app on the user device presents company-specific media content to the user. This may be in the form of a company logo, banner, advertisement and/or ringtone—and presented at the outset, during and/or conclusion of the call.

—Post-Call Events

In some embodiments, the app may be adapted to perform certain actions or events after a specific call concludes. For example, after a call from a specific company, a screen may be displayed requesting the user complete a survey based on their experience of the preceding call. This may be provided via another application or via a link to a website hosting the survey.

SUMMARY

In summary, a method of and apparatus and system for augmenting an incoming or outgoing (telephone) call with media content has been described.

It will be understood that the invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

What is claimed is:

1. A method of augmenting a telecommunications call, comprising:
  using a processor of a user telecommunications device for:
    detecting a telecommunications call event;
    selecting an item of media content, the item of media content being associated with a uniform resource identifier or URI;
    modifying a presentation of a call screen presented on a display of the user telecommunications device in association with the telecommunications call event by augmenting said presentation with the item of media content, without obscuring information related to said telecommunication call and presented on said display, during said telecommunications call event;
    detecting a user interaction with the augmented item of media content before termination of the call; and responsive to detecting the user interaction, on termination of the call, performing an action in dependence on the resource identified by the URI.

2. A method according to claim 1, wherein the selection of the item of media content is in dependence on at least one of: an attribute of the call; an attribute of a party placing the call; an attribute of a party receiving the call; and an attribute of the user device.

3. A method according to claim 1, wherein the selection of the item of media content is in dependence on an attribute of the user.

4. A method according to claim 3, wherein the attribute is at least one of: the user's browsing history; the user's call history; and the user's text message data.

5. A method according to claim 2, wherein the attribute is at least one of: an associated identity; an associated location; an associated date; and an associated time.

6. A method according to claim 1, wherein the item of media content comprises an image or video, and augmenting the call comprises displaying the media content to the user.

7. A method according to claim 1, wherein the item of media content comprises audio, and augmenting the call comprises playing the media content to the user.

8. A method according to claim 6, wherein the call is augmented at one or more of the following times: during the time the call is being initiated and whilst the call is in progress.

9. A method according to claim 1, the method further comprising receiving the item of media content from a remote server.

10. A method according to claim 9, wherein a selection of the item of media content is performed at the remote server.

11. A method according to claim 9, the method further comprising storing the item of media content in a local cache on the user device.

12. A method according to claim 9, wherein items of media content are provided to the remote server by a media content provider.

13. A method according to claim 1, wherein a selection of the item of media content is performed at the user device.

14. A method according to claim 1, wherein the call event is an incoming call.

15. A method according to claim 1, wherein the call event is an outgoing call.

16. A method according to claim 1, wherein the action performed in dependence on the resource identified by the URI comprises at least one of: accessing a network location, optionally accessing a web page; and initiating a further telecommunications call.

17. A method according to claim 6, wherein the displayed media content is overlaid on a call screen of the device.

18. Apparatus for augmenting a telecommunications call in the form of a client device, the apparatus comprising:
a non-transitory memory storing instructions; and
one or more hardware processors coupled to the non-transitory memory and configured to execute the instructions from the non-transitory memory to cause the system to perform operations comprising:
detecting a telecommunications call event at a user telecommunications device;
selecting an item of media content, the item of media content being associated with a uniform resource identifier or URI;
modifying a presentation of a call screen presented on a display of the user telecommunications device in association with the telecommunications call event by augmenting said presentation with the item of media content, without obscuring information related to said telecommunication call and presented on said display, during said telecommunications call event;
detecting a user interaction with the augmented item of media content before termination of the call; and
responsive to detecting the user interaction, on termination of the call, performing an action in dependence on the resource identified by the URI.

19. A system for augmenting telecommunications calls, the system comprising:
apparatus according to claim 1; and
a remote server having stored thereon media content for augmenting communications between the apparatus and at least one further similar apparatus.

* * * * *